United States Patent
Zhang

(10) Patent No.: US 10,997,692 B2
(45) Date of Patent: May 4, 2021

(54) AUTOMATIC IMAGE CROPPING BASED ON ENSEMBLES OF REGIONS OF INTEREST

(71) Applicant: Adobe Inc., San Jose, CA (US)

(72) Inventor: Jianming Zhang, Campbell, CA (US)

(73) Assignee: Adobe Inc., San Jose, CA (US)

( * ) Notice: Subject to any disclaimer, the term of this patent is extended or adjusted under 35 U.S.C. 154(b) by 76 days.

(21) Appl. No.: 16/548,232

(22) Filed: Aug. 22, 2019

(65) Prior Publication Data

US 2021/0056663 A1 Feb. 25, 2021

(51) Int. Cl.
*G06K 9/46* (2006.01)
*G06T 3/40* (2006.01)
*G06T 7/73* (2017.01)
*G06K 9/32* (2006.01)

(52) U.S. Cl.
CPC ............ *G06T 3/403* (2013.01); *G06K 9/3233* (2013.01); *G06K 9/4671* (2013.01); *G06T 7/74* (2017.01); *G06T 2210/22* (2013.01)

(58) Field of Classification Search
CPC ....... G06T 3/403; G06T 7/74; G06T 2210/22; G06K 9/4671; G06K 9/3233
USPC ........................................................ 382/282
See application file for complete search history.

(56) References Cited

U.S. PATENT DOCUMENTS

| | | | |
|---|---|---|---|
| 5,566,280 A | 10/1996 | Fukui et al. | |
| 9,626,584 B2 | 4/2017 | Lin et al. | |
| 9,697,612 B2 * | 7/2017 | Wei | G06T 7/11 |
| 2005/0276477 A1 * | 12/2005 | Lin | G06T 11/60 |
| | | | 382/173 |
| 2013/0108175 A1 | 5/2013 | Ptucha | |
| 2013/0148880 A1 * | 6/2013 | Kennedy | G06K 9/62 |
| | | | 382/159 |
| 2014/0267435 A1 * | 9/2014 | Choe | G06T 11/60 |
| | | | 345/660 |
| 2015/0161466 A1 | 6/2015 | Welinder et al. | |
| 2015/0206169 A1 | 7/2015 | Ye et al. | |
| 2017/0083762 A1 * | 3/2017 | Segalovitz | G06K 9/00463 |
| 2017/0294038 A1 | 10/2017 | Moriya | |
| 2018/0184062 A1 * | 6/2018 | Hariri | H04N 5/232939 |
| 2018/0352191 A1 * | 12/2018 | Eppolito | G09G 5/00 |
| 2020/0394434 A1 * | 12/2020 | Rao | G06K 9/40 |

OTHER PUBLICATIONS

Chen, Jiansheng, Automatic Image Cropping: a Computational Complexity Study, Computer Vision Foundation, Proceedings of the IEEE Conference on Computer Vision and Pattern Recognition, 2016, pp. 507-515.
Final Office Action dated Nov. 21, 2019 in U.S. Appl. No. 15/620,636, 14 pages.
Non-Final Office Action dated Mar. 26, 2020 in U.S. Appl. No. 15/620,636, 12 pages.
Notice of Allowance dated Aug. 20, 2020 in U.S. Appl. No. 15/620,636, 9 pages.

* cited by examiner

*Primary Examiner* — Ali Bayat
(74) *Attorney, Agent, or Firm* — Shook, Hardy & Bacon L.L.P.

(57) ABSTRACT

A crop generation system determines multiple types of saliency data and multiple crop candidates for an image. Multiple region of interest ("ROI") ensembles are generated, indicating locations of the salient content of the image. For each crop candidate, the crop generation system calculates an evaluation score. A set of crop candidates is selected based on the evaluation scores.

20 Claims, 7 Drawing Sheets

AUTOMATIC IMAGE CROPPING BASED ON ENSEMBLES OF REGIONS OF INTEREST

TECHNICAL FIELD

This disclosure relates generally to the field of image editing, and more specifically relates to automatic cropping of a graphical digital image.

BACKGROUND

Image editing systems that are accessible by a personal camera device, such as a smartphone or a wearable camera, provide options for image modification. A personal camera device could be relatively simple or unsophisticated, with little processing power. For example, the personal camera may lack computing resources to provide image editing software tools. An image editing system that is accessible by the personal camera provides options to modify a captured image quickly and accurately, without requiring the personal camera device to have increased processing power or local storage.

In some cases, a person uses an image editing system to crop an image that he or she has captured using a personal camera device. The person may desire to use the captured image in a particular computing environment, such as in a post to a social media platform or as a background on a smartphone. The image editing system provides, for example, cropping options to modify a size or shape of the image, such as to prepare the image for presentation on the social media platform. In some cases, the person desires accurate crop candidates that accurately preserve the content of the image. In addition, the person desires the crop candidates to be presented rapidly or automatically, without requiring additional time or use of image editing features by the person.

SUMMARY

According to certain embodiments, a crop generation system receives a digital graphical image as an input. A first crop candidate and a second crop candidate are identified for the input image. The first crop candidate and second crop candidate each encompass different portions of the input image. A region of interest ("ROI") ensemble is generated, including a first ROI and a second ROI that each encompass visual content indicated by saliency data for the input image. The first ROI encompasses a first portion of the input image having visual content indicated by the saliency data. The second ROI encompasses a second portion of the input image having different visual content indicated by the saliency data. A first evaluation score is computed for the first crop candidate and a second evaluation score is computed for the second crop candidate. Each evaluation score indicates a preservation, by the first or second crop candidate, respectively, of the visual content included in a combination of at least the first and second ROI. A selected set of crop candidates is generated based on the first evaluation score and the second evaluation score. The selected set of crop candidates includes the first crop candidate and excludes the second crop candidate. The selected set of crop candidates is provided to an image editing application.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
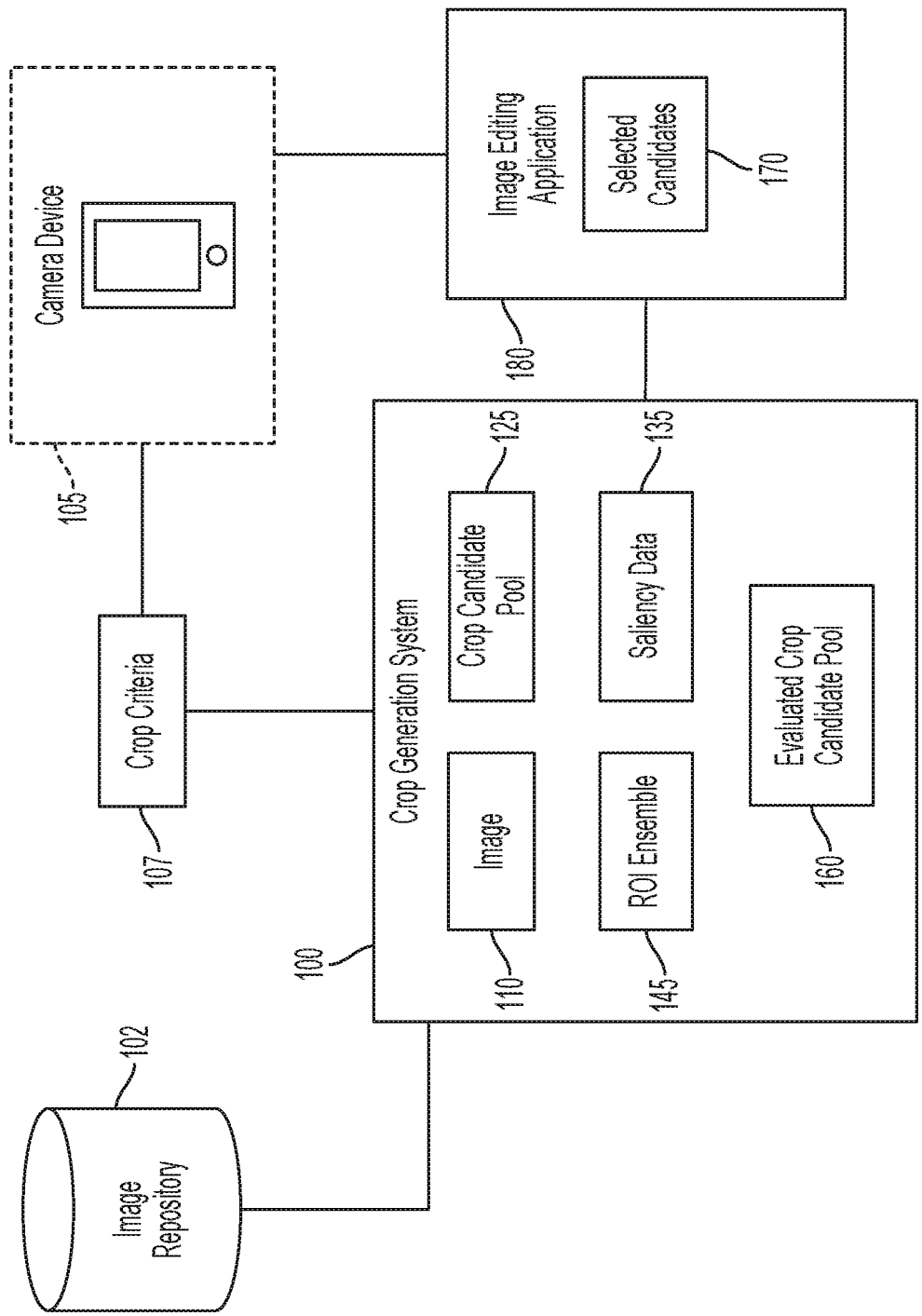
FIG. 1 is a block diagram depicting an example computing environment in which a crop generation system 100 is implemented, according to certain embodiments.

Some existing image cropping techniques provide automatic cropping for digital graphical images by using saliency maps to generate crop candidates, such as by applying search strategies to saliency data. However, existing saliency-based cropping techniques lack flexibility, and are unable to integrate sophisticated rules, such as rules for determining which salient areas are the most important. In addition, some existing image cropping techniques identify an ROI to generate crop candidates, but existing region-based cropping techniques are limited to identifying an ROI based on a specific training, such as training to detect faces. The existing region-based cropping techniques are unable to determine a crop candidate for images that do not include content related to the training.

Certain embodiments described herein provide for a crop generation system that generates and evaluates crop candidates based on at least one region of interest ("ROI") for multiple types of salient visual content in the image. In some cases, the disclosed example crop generation system is capable of quickly evaluating a relatively large group of crop candidates for an image (e.g., 1000-10000 candidates) based on multiple ROI ensembles that correspond to the multiple types of salient visual content, such as evaluating up to about 10,000 crop candidates in less than about one second.

The following example is provided to introduce certain embodiments of the present disclosure. In this example, a crop generation system receives a digital graphical image from a camera device, such as an image of two dogs sitting in a grassy field. The crop generation system generates a pool of crop candidates based on the image. For instance, the crop candidates could include a first crop depicting only the first dog, a second crop depicting only the second dog, a third crop depicting only the two dogs' heads against the backdrop of a sky, or other example crop candidates. The crop generation system also receives saliency data for the image. The saliency data indicates areas of the image that draw the attention of a person viewing the image. Examples of saliency data for the image include an object saliency map and an eye fixation saliency map. For instance, an object saliency map for the image of dogs could be a digital mask identifying the outlines of the dogs' bodies, and an eye fixation saliency map for the image of dogs could be a heat map identifying the dogs' facial regions (e.g., an image area likely to draw the viewer's attention).

Continuing with this example, the crop generation system generates multiple ROI ensembles from the saliency data. Each ROI ensemble corresponds respectively to one of the saliency maps, and includes at least one ROI for each salient area. For the example image of the two dogs, for instance, an object ROI ensemble based on the object saliency map could include multiple ROIs encompassing the outline of the first dog, and also multiple ROIs encompassing the outline of the second dog. Also, an eye fixation ROI ensemble based on the eye fixation saliency map could include multiple ROIs encompassing the facial regions of the dogs. The crop generation system evaluates each of the crop candidates based on the ROI ensembles. In the example crop generation system, the evaluation includes calculating at least one content preservation score and at least one composition preservation score. For each respective crop candidate, the content preservation score indicates a degree to which the respective candidate preserves salient visual content in the image, and the composition preservation score indicates a degree to which the respective crop candidate preserves relative locations of salient visual content in the image. An evaluation score for a respective crop candidate is determined based on a combination of the candidate's respective content and composition preservation scores. For the example image of the two dogs, for instance, a particular crop candidate has a content preservation score calculated based on how many of the ROIs for the dogs' outlines and facial regions are included in the particular candidate, and also based on a ratio of how much of each ROI is included. The particular crop candidate also has a composition preservation score calculated based on whether each ROI has a similar location in the particular candidate as compared to the ROI's location in the uncropped image. The evaluation score for the particular candidate indicates whether the candidate includes both dogs' outlines, whether it includes both dogs' faces, how much of the outlines and facial regions are included, and whether the outlines and faces have a similar location within the particular candidate as they did in the example image (e.g., centered, off-center).

Continuing with this example, the crop generation system selects one or more of the crop candidates based on the evaluation score, or a component of the evaluation score. For example, the crop generation system generates a first modified pool of crop candidates based on a comparison of each content preservation score to a content threshold. Additionally or alternatively, the crop generation system generates a second modified pool of crop candidates based on a comparison of each composition preservation score to a composition threshold. Furthermore, the crop generation system generates a third modified pool of crop candidates based on a comparison of each evaluation score (e.g., a combination of the content and composition preservation scores) to an evaluation threshold. In some cases, each of the content, composition, and evaluation thresholds has a respective threshold value, such that a relative importance is associated with the content, composition, and evaluation scores. The crop generation system selects one or more of the crop candidates based on the multiple comparisons. For example, the crop generation system selects a crop candidate that has content, composition, and evaluation scores that each fulfill the respective thresholds. In the example involving an image of two dogs, a first crop candidate that includes the outlines and faces of both dogs could fulfill the content threshold, while a second image that includes the outline and face of only one dog, or that includes the dogs' bodies but crops out the dogs' faces, could fail to fulfill the content threshold. Also, the first crop candidate could fulfill the composition threshold based on the dogs having a location that is similar to their location in the original image (e.g., centered), while a third crop candidate could fail to fulfill the composition threshold based on the dogs having a location different from the original image (e.g., off-center, at an edge of the third candidate). In this scenario, the crop generation system could select the first crop candidate and not select the second or third candidates, based on the first candidate's fulfillment of the content threshold and the composition threshold.

Certain embodiments described herein can provide improvements over existing image cropping techniques. For instance, image editing tools often provide automatic cropping for digital graphical images by using saliency maps to generate crop candidates, such as by applying search strategies to saliency data (e.g., searching for a most salient area). Various techniques described herein can provide improved flexibility to automatic cropping processes. These described techniques can integrate rules for determining which salient areas are the most important, into the cropping process. For instance, selection of crop candidates based on the comparisons of the content, composition, and evaluation scores to respective thresholds allows the crop generation system flexibility in determining whether content, or composition, or a combination of content and composition has a higher relative importance for a particular image. In addition, the crop generation system can be configured to apply a rule indicating a relative importance of a type of saliency data (e.g., object saliency data, eye fixation saliency data). For example, the crop generation system may apply a rule indicating that object saliency data has a relatively high importance for an image of a person, and that eye fixation saliency data has a relatively high importance for an image of a landscape. Using such rules can, in some cases, reduce the need to identify an ROI using a trained model. For instance, although a model could be specifically trained to detect faces and thereby identify ROIs depicting faces, such models may not be able to identify a crop candidate for images that do not include content related to the training (i.e., images that do not depict faces). Embodiments described herein can augment or otherwise improve upon such model-based techniques by enabling a crop generation system to evaluate crop candidates based on multiple types of ROIs.

As used herein, the terms "salient" and "saliency" refer to visual regions that draw attention to themselves, relative to other visual regions. A salient area of an image, for example, is an area having visual characteristics that encourage the attention of a viewer. Based on visual characteristics such as color, size, or position, the viewer is encouraged to quickly look towards the salient area, and to spend additional time viewing the salient area, as compared to additional areas of the image that are less salient. In some cases, saliency for an area is determined based on relative relationships between visual characteristics of the area and additional visual characteristics of additional areas. For example, in an image depicting a bright red ball, an area including the bright red ball has a high saliency compared to additional image areas that depict a dull grey background. However, if the image depicts a large number of brightly colored red balls, the example area including the bright red ball could have a low saliency compared to additional image areas depicting the other brightly colored red balls.

As used herein, the terms "region of interest" and "ROI" refer to a group of pixels in an image that depict a salient area, or a portion of a salient area. An ROI encompasses, for example, part or all of a salient area that is indicated by a saliency map. The ROI has a boundary that indicates the pixels that are included in the ROI (e.g., within the boundary). In some cases, the boundary could be rectangular, such as a bounding box having corner coordinates (e.g., pixel coordinates) that indicate the size and location of the ROI. Additionally or alternatively, the boundary could have another shape with additional coordinates (or other characteristics) that indicate the shape of the encompassed area. In some cases, an ROI includes only pixels that are associated with the depicted salient area, such as if the ROI is smaller than the salient area. Additionally or alternatively, an ROI includes additional pixels that are not associated with the depicted salient area, such as pixels associated with background areas or other salient areas of the image.

As used herein, the terms "digital graphical image" and "image" refer to images including pixels, such as a raster image or a bitmap image. In some cases, an image has a structure that is based on pixels, including a visual appearance or a file format (e.g., .BMP, .JPG, .JPEG, .PNG). An image, for example, includes a quantity of pixels arranged in one or more arrays, and each pixel is associated with data describing the appearance of the pixel, such as color, location, transparency, saturation, or any other suitable visual characteristic. A digital graphical image is created or modified via a computing system, such as a camera device or a computing system executing an image editing application.

Referring now to the drawings, FIG. 1 depicts an example of a computing environment in which a crop generation system 100 is implemented. In FIG. 1, the crop generation system 100 is configured for communicating with a camera device 105, an image editing application 180, or both. The camera device 105 is depicted as a smartphone, but other implementations are possible. For example, a camera device in the example computing environment could include one or more of a personal computer, a laptop, a tablet computer, a body-mounted camera system, a scanner, a digital camera, or any other suitable computing device capable of capturing or storing images. In some embodiments, the crop generation system 100 is further configured for communicating with a storage system, such as an image repository 102, that is capable of storing a large volume of images, such as an image database.

In some embodiments, the image editing application 180 can be executed on the camera device 105. Additionally or alternatively, the image editing application 180 can be executed on an additional computing system, such as a personal computer, a server (e.g., a server implementing the crop generation system 100), a virtual computing system (e.g., a virtual server, a "cloud-based" computing system), or another suitable computing system. In some cases, the image editing application 180 is accessed by the camera device 105 via one or more networks, such as a web-based software application that is accessible via a browser or other suitable interface application.

In FIG. 1, the crop generation system 100 receives an image 110. For example, the image 110 is received from one or more of the camera device 105, the image editing application 180, or the image repository 102. In some cases, the image 110 is a digital graphical image, such as an image including pixels. Each pixel in the image 110 indicates graphical data, such as one or more colors (e.g., red-green-blue, RGB), locations (e.g., coordinates), hue, saturation, or other information representing graphical data. In some embodiments, the image 110 depicts visual content, such as a photograph, a graphical design, a video, a digitally rendered drawing or other artwork, computer-generated imagery, or other suitable types of visual content.

The crop generation system 100 determines one or more crop candidates for the image 110. For instance, the crop generation system 100 generates a crop candidate pool 125, which includes various crop candidates. In some embodiments, each of the crop candidates encompasses a particular portion of the image 110. For example, different crop candidates could encompass the entirety of the image 110, a corner portion, a central portion, a portion that overlaps with another crop candidate, or other suitable respective portions of the image 110. In some cases, the crop generation system 100 determines the crop candidates based on one or more crop criteria, such as crop criteria 107 that are received from (or otherwise associated with) the camera device 105. For example, the crop criteria 107 indicate one or more of a dimension, an aspect ratio, a resolution, or other suitable criteria. In some cases, the criteria 107 are received from the camera device 105 (e.g., via a user interface included in the camera device 105) or from the image editing application 180. Additionally or alternatively, the criteria 107 are received from an additional computing system, such as from a network-based software application that is accessed, for example, via a user interface of the camera device 105. In some cases, the crop generation system 100 generates the crop candidate pool 125 based on the crop criteria 107, such as by including crop candidates that match a dimension, aspect ratio, or other indicated criteria.

In some cases, the crop generation system 100 generates (or otherwise receives) saliency data that is generated based on the image 110, such as saliency data 135. In some embodiments, saliency data refers to digital data indicating areas of an image that have a relatively high importance for viewing and interpretation of the image. In some cases, the saliency data 135 includes one or more data structures that indicate regions of the image 110 that include salient visual content. Salient visual content could include one or more of, for instance, figures, faces, brightly colored objects, an activity (e.g., throwing a ball, shaking hands), contrasting shades (e.g., dark shadows on a pale sidewalk), or any other suitable visual content that is featured in an image. In some cases, salience of visual content in the image 110 is indicated by the saliency data 135. Saliency data includes, for example, data indicating whether the visual content draws attention of a viewer based on visual characteristics of the content (e.g., color, size, location). For instance, object saliency data indicates a location of one or more objects depicted in an image, such as a human figure, an animal figure, a vehicle, or other depicted objects. Additionally or alternatively, eye fixation saliency data indicates a location of one or more areas that include attention-grabbing content, such as areas with faces, bright colors, contrasting shades, or other characteristics that encourage attention fixation. The saliency data 135 includes one or more of an object saliency map, an eye fixation saliency map, or other representations of salient content. In some cases, the saliency data 135 indicates a location of salient visual content, such as coordinates of pixels that are included within a salient area of the image 110.

In some embodiments, the crop generation system 100 determines at least one ROI associated with the image 110, based on the saliency data 135. The ROI encompasses (or otherwise indicates) an image portion that includes salient visual content depicted in the image 110. For example, the ROI indicates coordinates (e.g., pixel coordinates) of a particular portion including a group of pixels that depict the salient visual content. Additionally or alternatively, the crop generation system 100 generates at least one ROI ensemble, which is a set of multiple ROIs. For example, based on the saliency data 135, the crop generation system 100 generates an ROI ensemble 145. In some cases, the crop generation system 100 generates multiple ROI ensembles based on multiple types of saliency data. For example, the crop generation system 100 could generate an object ROI ensemble based on an object saliency map and an eye fixation ROI ensemble based on an eye fixation saliency map.

In FIG. 1, the crop generation system 100 evaluates each of the crop candidates in the crop candidate pool 125 based on the ROI ensemble 145. Additionally or alternatively, the crop generation system 100 generates a pool of the evaluated crop candidates, such as an evaluated crop candidate pool 160. In some cases, each of the evaluated crop candidates is associated with an evaluation score that is determined by the crop generation system 100. Each evaluation score indicates, for a particular respective one of the crop candidates, a preservation of visual content that is included in the multiple ROIs in the ROI ensemble 145. For example, if the ensemble 145 includes a first ROI encompassing a first portion of the image 110 and a second ROI encompassing a second portion, the evaluation score for a particular crop candidate indicates whether the crop candidate preserves the combination of visual content encompassed by the first and second ROI (e.g., in the first and second image portions). In some cases, the evaluation score indicates a numeric value that represents whether the particular crop candidate accurately preserves one or more of the content of the first and second ROI, or the composition of the first and second ROI within the image 110. For example, the evaluation score indicates one or more of whether the particular crop candidate includes the visual content of the first and second ROI, a proportion of how much of the visual content is included from each ROI, a centeredness of the visual content from each ROI, a similarity of the centeredness, or other crop evaluation metrics.

Based on the evaluation scores for each of the evaluated crop candidates, the crop generation system 100 selects one or more of the evaluated crop candidates from the evaluated candidate pool 160. For example, the crop generation system 100 selects the evaluated candidates based on a comparison of each evaluation score to a threshold, such as candidates having an evaluation score above (or below) the threshold. Additionally or alternatively, the crop generation system 100 selects the evaluated candidates based on a target quantity, such as a set of six evaluated candidates having the six highest (or lowest) evaluation scores. In some cases, the crop generation system 100 provides the selected crop candidates, such as a set of selected candidates 170, to the image editing application 180. Additionally or alternatively, the crop generation system 100 provides the selected crop candidates to an additional computing system, such as to one or more of the camera device 105 or the image repository 102. In some cases, one or more computer-implemented image modification techniques are performed based on the selected candidates 170. For example, the image editing application 180 could edit the image 110 based on one or more of the selected candidates 170, such as by cropping the image 110 based on a selected crop candidate. Additionally or alternatively, the camera device 105 could provide (e.g., via a user interface) an indication of a particular candidate(s) of the selected candidates 170, and the image editing application 180 could edit the image 110 based on the indicated candidate(s).

Figure 2:
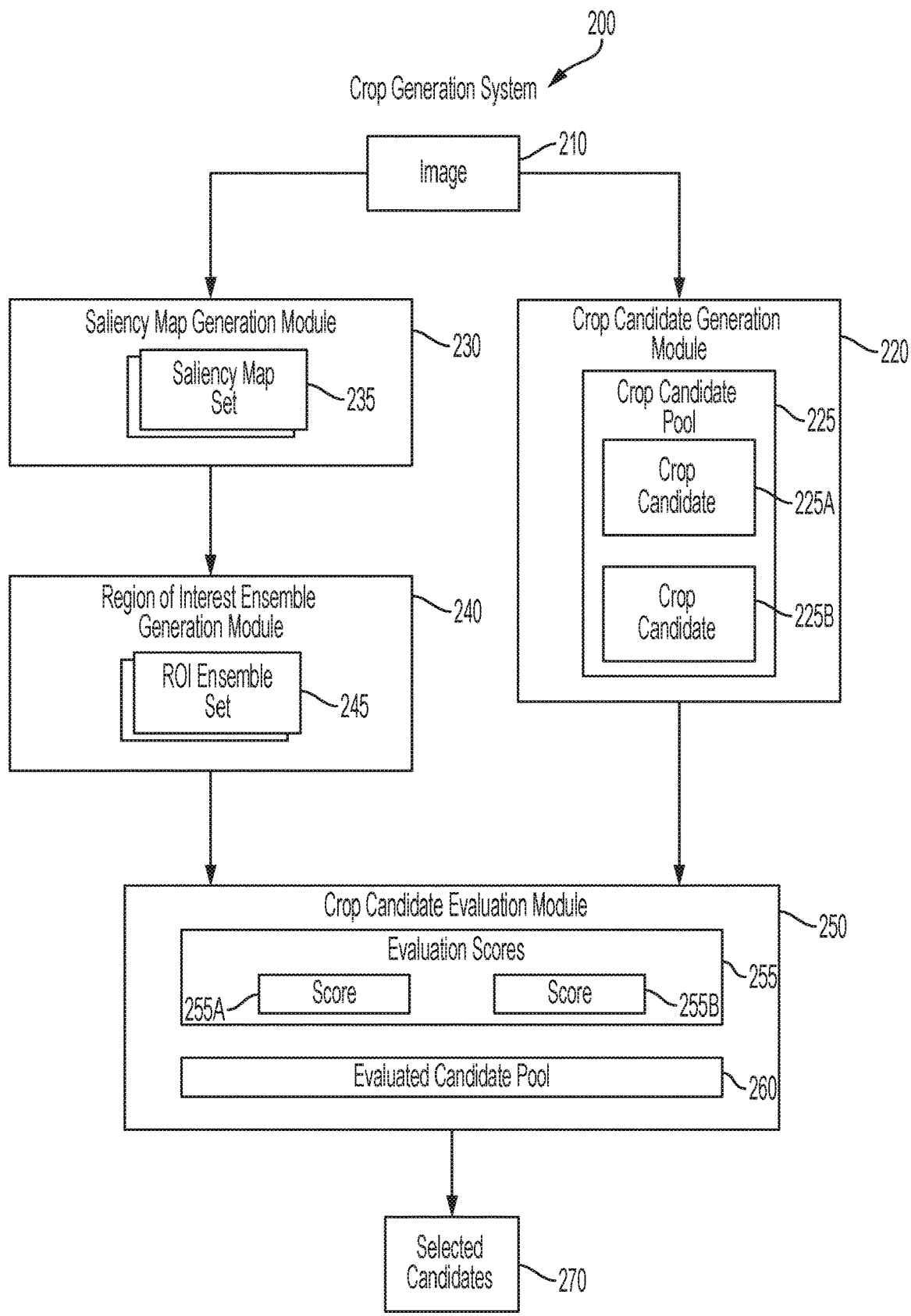
FIG. 2 is a block diagram depicting an example of modules included in a crop generation system, according to certain embodiments.

In some embodiments, a crop generation system includes multiple components or software modules that are configured to perform techniques related to evaluating a group of crop candidates. FIG. 2 depicts an example of a crop generation system 200 that includes a crop candidate generation module 220, a saliency map generation module 230, an ROI ensemble generation module 240, and a crop candidate evaluation module 250. In some cases, one or more of the modules 220, 230, 240, or 250 are configured to implement operations, such as computer-executed software instructions, that perform various aspects of the evaluation techniques described herein. Additionally or alternatively, one or more of the modules 220, 230, 240, or 250 are configured to receive, from an additional computing system, data that is related to various aspects of the evaluation techniques described herein. For example, a saliency map generation module could be configured to communicate, via one or more networks, with an additional computing system that determines saliency data based on deep learning neural network techniques.

The crop generation system 200 includes an image 210, such as a digital graphical image received from (or otherwise indicated by) a camera device, such as described in regards to FIG. 1. In FIG. 2, the crop generation system 200 provides the image 210 to one or more of the modules 220, 230, 240, or 250. The crop generation system 200 provides, for example, a copy of the image 210 to a particular module, or allows the particular module to access the image 210, or provides the image 210 via another suitable technique.

For example, the crop candidate generation module 220 receives (or otherwise accesses) the image 210. Based on the image 210, the crop candidate generation module 220 determines a pool of multiple crop candidates, such as a crop candidate pool 225. In some cases, the multiple crop candidates are determined based on one or more criteria, such as the crop criteria 107 described in regards to FIG. 1. The crop candidate pool 225 includes, at least, a first crop candidate 225A and a second crop candidate 225B. Each of the multiple crop candidates of the crop candidate pool 225, including the candidates 225A and 225B, encompasses a respective portion of the image 210. For instance, respective crop candidates could encompass a corner portion, a central portion, or the entirety of the image 210. In some cases, multiple crop candidates could encompass portions that are overlapping (e.g., the overlapping portions each include a same group of one or more particular pixels), nested (e.g., a portion with smaller dimensions that is within a portion with larger dimensions), adjacent (e.g., portions that share a boundary or part of a boundary), separate (e.g., separated by one or more pixels not included in one of the separated portions), or any combination of these. For example (and not by way of limitation), the first crop candidate 225A could encompass a first portion such as a left half of the image 210, and the second crop candidate 225B could encompass a second portion such as a top half of the image 210.

Additionally or alternatively, the saliency map generation module 230 receives (or otherwise accesses) the image 210. The saliency map generation module 230 determines saliency data of the image 210. In the crop generation system 200, the saliency data includes at least two types of saliency data, such as eye fixation saliency data and object saliency data. The saliency map generation module 230 generates a set of saliency maps, such as a saliency map set 235, that describes the types of saliency data. For example, the saliency map set 235 includes an eye fixation saliency map and an object saliency map. Each map in the saliency map set 235 indicates regions of the image 210 that include salient visual content. In some cases, a particular saliency map indicates one region, multiple regions, or zero regions. Additionally or alternatively, a quantity of regions indicated by a particular saliency map could be the same as or different from a quantity of regions indicated by another saliency map. For example (and not by way of limitation), if the image 210 depicts a calm body of water, the object saliency map could indicate zero regions of salient visual content (e.g., no objects are visible on the body of water), and the eye fixation saliency map could indicate several regions of salient visual content (e.g., color gradients of water, a central area on a horizon). As an alternative example (and not by way of limitation), if the image 210 depicts a standing person, the object saliency map could indicate one region of salient visual content (e.g., the shape of the person), and the eye fixation saliency map could also indicate one region of salient visual content (e.g., the face of the person).

In the crop generation system 200, the ROI ensemble generation module 240 determines multiple ROIs associated with the image 210. The ensemble generation module 240 receives (or otherwise accesses) the saliency map set 235. Additionally or alternatively, the ROI ensemble generation module 240 generates a set of ROI ensembles, such as an ROI ensemble set 245, that describes portions of the image 210 that include visual content. Based on each saliency map included in the saliency map set 235, the ROI ensemble generation module 240 generates a respective ROI ensemble. For example, an eye fixation ROI ensemble is generated based on the eye fixation saliency map and an object ROI ensemble is generated based on the object saliency map. The generated ROI ensembles are included in the ROI ensemble set 245. In the crop generation system 200, each ROI ensemble in the ROI ensemble set 245 includes multiple ROIs. Additionally or alternatively, a quantity of ROIs included in a particular ROI ensemble may be the same as or different from a quantity of ROIs indicated by another ROI ensemble. Furthermore, a particular ROI ensemble could include multiple ROIs that are associated with a particular portion of salient visual content indicated by the associated saliency map. As a non-limiting example, if the image 210 depicts two people, the object ROI ensemble could include multiple ROIs for the first person and also multiple ROIs for the second person.

In FIG. 2, the crop candidate evaluation module 250 computes an evaluation score for each of the crop candidates in the pool 225. The evaluation module 250 receives (or otherwise accesses) the crop candidate pool 225 and the ROI ensemble set 245. Additionally or alternatively, the evaluation module 250 generates a set of evaluation scores, such as evaluation scores 255, that is associated with the crop candidate pool 225. Each crop candidate is associated with an evaluation score that indicates the respective crop candidate's preservation of the visual content included in the ROIs of the ensemble set 245. For example, the evaluation scores 255 include an evaluation score 255A that is associated with the crop candidate 225A, and an evaluation score 255B that is associated with the crop candidate 225B. The score 255A indicates a preservation of the visual content in the ensemble set 245 by the crop candidate 225A. The score 255B indicates a preservation of the visual content in the ensemble set 245 by the crop candidate 225B.

In some cases, an evaluation score in the scores 255 includes at least one numeric value that is based on one or more comparisons of the respective crop candidate to the multiple ROI ensembles in the ensemble set 245. For example, each of the evaluation scores 255 includes a numeric value that represents whether the respective associated crop candidate accurately preserves a combination of the visual content in the ROIs of the ensemble set 245. Additionally or alternatively, each of the evaluation scores 255 is based on a combination of multiple component scores. The score 255A is based on, for instance, at least one content preservation score indicating whether the crop candidate 225A includes salient visual content of the image 210, and at least one composition preservation score indicating whether salient visual has a similar location (e.g., centeredness) in the crop candidate 225A as compared to the image 210. Additionally or alternatively, the score 255B is based on at least one content preservation score indicating the inclusion of salient visual content in the crop candidate 225B, and at least one composition preservation score indicating the location of salient visual content in the crop candidate 225B. Each additional evaluation score in the evaluation scores 255 is based on at least one content preservation score and at least one composition preservation score, indicting (respectively) an inclusion and location of salient visual content in the respective associated crop candidate. In some cases, each evaluation score is based on a combination of the content preservation score and composition preservation score, such as a sum, a weighted sum, or another type of combination.

In some cases, the crop generation system 200 generates a pool of evaluated crop candidates, such as an evaluated candidate pool 260, based on the evaluation scores 255. A set of one or more evaluated crop candidates from the pool 260 are selected based on the associated evaluation scores, such as crop candidates having an associated score above a threshold value, a highest scored quantity or percentage of crop candidates, or another suitable selection metric for the evaluation scores. The crop generation system 200 provides one or more of the selected candidates, such as selected candidates 270, to an additional computing system, such as to an image editing application (e.g., as described in regards to FIG. 1).

Figure 3:
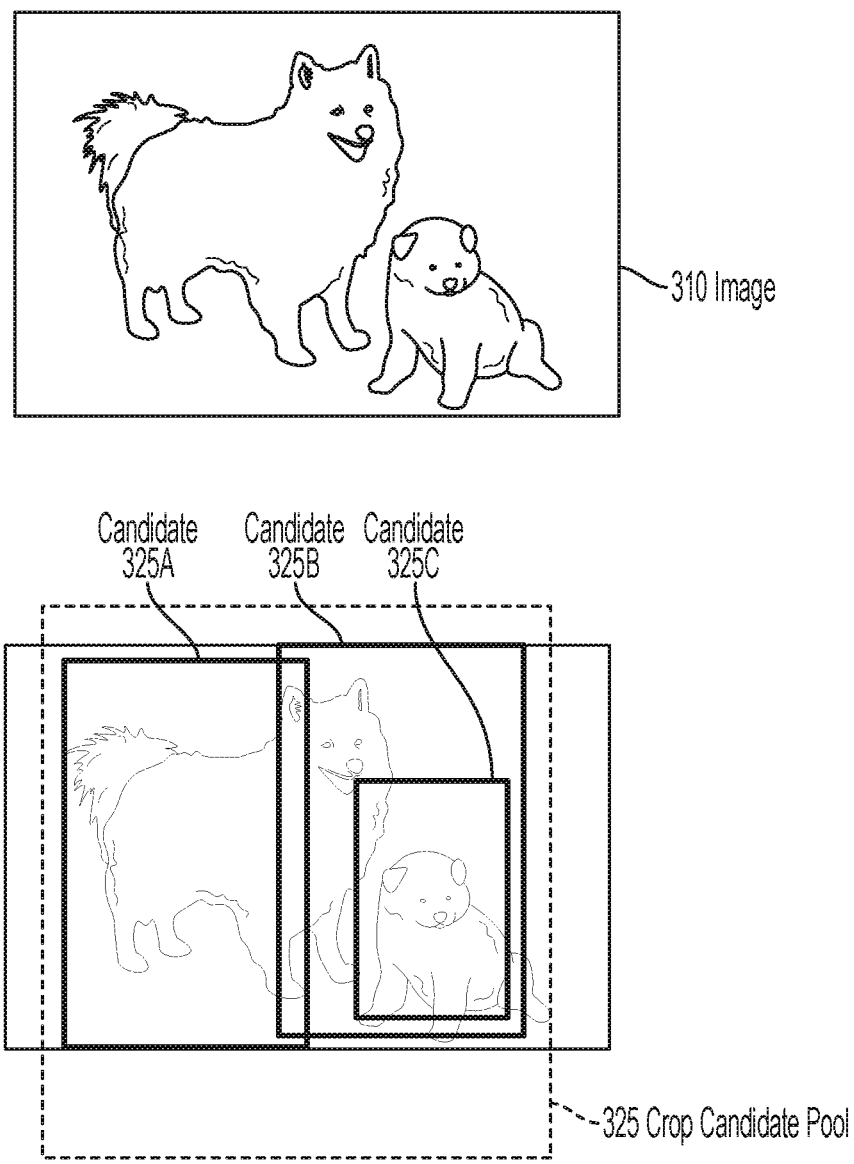
FIG. 3 is a diagram depicting an example of a crop candidate pool that is generated based on an image, according to certain embodiments.
Figure 4:
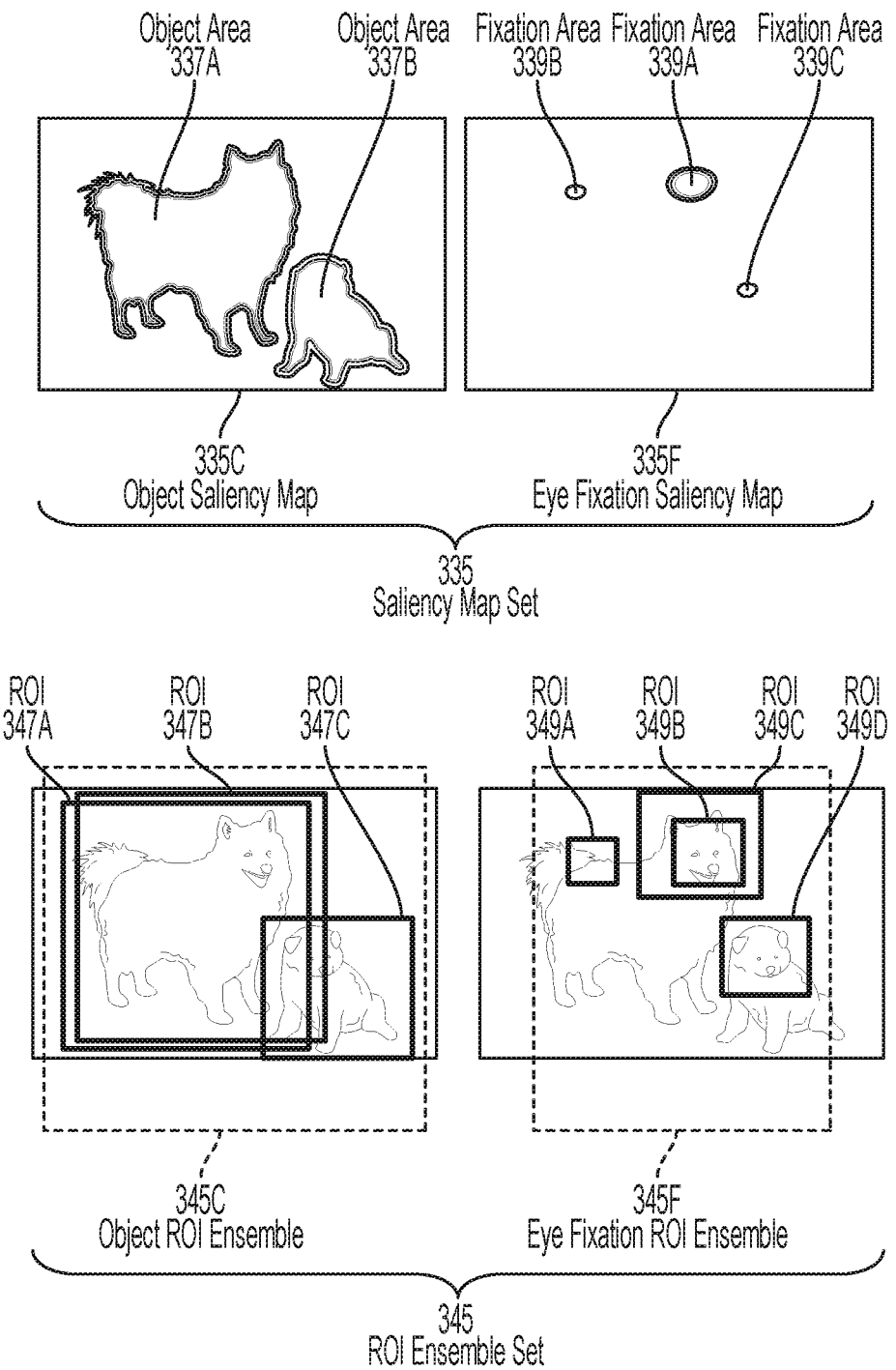
FIG. 4 is a diagram depicting examples of multiple saliency maps and multiple ROI ensembles that are generated based on an image, according to certain embodiments.

In some embodiments, a crop generation system evaluates multiple crop candidates based on multiple types of saliency data. For example, the crop generation system computes an evaluation score for each of the multiple crop candidates based on component scores calculated based on an object ROI ensemble and on component scores calculated based on an eye fixation ROI ensemble. FIG. 3 is a diagram depicting an example of a crop candidate pool, such as a crop candidate pool 325, that is generated based on an example image, such as an image 310. FIG. 4 is a diagram depicting examples of multiple saliency maps, such as a saliency map set 335, and multiple ROI ensembles, such as an ROI ensemble set 345, that are generated based on the example image 310. In some embodiments, the image 310 is received by a crop generation system, which generates one or more of the crop candidate pool 325, the saliency map set 335, or the ROI ensemble set 345. For example, the crop generation system 200 could generate one or more of the crop candidate pool 325, the saliency map set 335, or the ROI ensemble set 345, based on techniques described in regards to FIG. 2.

In FIG. 3, the image 310 depicts a non-limiting example of a digital graphical image that is received by a crop generation system. The image 310 includes visual content, such as the example depictions of an adult dog and a puppy. The image 310 also includes additional visual content, such as depictions of grass, shadows, or other additional content.

In some cases, the adult dog and puppy are considered salient visual content, and the additional content is considered background content.

In FIG. 3, the crop candidate pool 325 is generated based on the image 310, such as by a crop candidate generation module. The crop candidate pool 325 includes multiple crop candidates, including crop candidate 325A, crop candidate 325B, and crop candidate 325C. For convenience, and not by way of limitation, a reproduction of the image 310 is depicted with the crop candidate pool 325, indicating locations of the candidates 325A through 325C relative to the image 310. In some cases, a crop candidate pool may, but need not necessarily, include graphical data representing an image from which crop candidates are generated. In some embodiments, the crop candidates in the candidate pool 325 are represented via a suitable data type or data structure, such as one or more of coordinates (e.g., pixel coordinates), dimensions (e.g., height, width), database records, or any other suitable data.

In FIG. 3, a crop generation system generates the candidate pool 325 based on one or more criteria, such as a resolution or an aspect ratio. For example, and not by way of limitation, if the candidate pool 325 is generated based on a criteria specifying a 3:2 aspect ratio, each of the crop candidates in the crop candidate pool 325, including the candidates 325A through 325C, has a 3:2 aspect ratio that fulfills the example criteria. Each of the crop candidates in the pool 325 encompasses a portion of the visual content of the image 310. For example, the candidate 325A encompasses a portion of the adult dog's body and a portion of the ground where the dog is standing. The candidate 325B encompasses the faces of the adult dog and the puppy, and some surrounding ground. The candidate 325C encompasses the face of the puppy, a portion of the adult dog's body, and some of surrounding ground. In FIG. 3, the candidates 325A and 325B are overlapping, and both encompass a particular portion of the visual content. For example, a region of pixels at the right edge of the candidate 325A is also encompassed at the left edge of candidate 325B (e.g., pixels depicting part of the adult dog's body). Candidates 325B and 325C are nested, and the visual content encompassed by candidate 325C is also encompassed by 325B. For example, the dimensions of candidate 325C are smaller than the dimensions of candidate 325B, such that the boundaries and coordinates of candidate 325C are included within (or are identical to) the boundaries and coordinates of candidate 325B. Candidates 325A and 325C are separate, and none of the visual content encompassed by candidate 325A is encompassed by 325C.

In FIG. 4, the saliency map set 335 is generated based on the image 310, such as by a saliency map generation module. The saliency map set 335 includes multiple saliency maps, including an object saliency map 335C and an eye fixation saliency map 335F. For convenience, and not by way of limitation, the saliency maps 335C and 335F are depicted as graphical maps (e.g., digital images, digital masks, heat maps), but other embodiments are possible. For example, one or more of an object saliency map or an eye fixation saliency map may be represented as a set of numeric values, as a database record, or other suitable data structures (including data structures not intended for human interpretation).

The object saliency map 335C indicates a location of one or more objects depicted in the image 310. In FIG. 4, for example, the object saliency map 335C includes an object area 337A that corresponds to the shape of the adult dog and an object area 337B that corresponds to the shape of the puppy. In some cases, the object saliency map 335C includes data (e.g., a digital mask, a heat map) representing the object areas 337A and 337B. In FIG. 4, background content of the image 310, such as surrounding ground or plants, is not indicated by an object area in the object saliency map 335C.

The eye fixation saliency map 335F indicates the location of one or more areas that are likely to draw the attention of a viewer of the image 310. In FIG. 4, for example, the eye fixation saliency map 335F includes a fixation area 339A that corresponds to the face of the adult dog, a fixation area 339B that corresponds to the tail of the adult dog, and a fixation area 339C that corresponds to the face of the puppy. In some cases, the eye fixation saliency map 335F includes data (e.g., a heat map) representing the fixation areas 339A, 339B, and 339C. In some embodiments, there may, but need not necessarily be, a correlation between an object area in an object saliency map and a fixation area in an eye fixation saliency map. For example, in FIG. 4, the object area 337A, the fixation area 339A, and the fixation area 339B each correspond to the visual content of the adult dog. However, additional saliency maps that are based on an additional image may include eye fixation areas and object areas that are not correlated with a particular portion of the visual content.

In FIG. 4, the ROI ensemble set 345 is generated based on the saliency map set 335, such as by an ROI ensemble generation module. The ROI ensemble set 345 includes multiple ROI ensembles that are generated based on a respective saliency map from the saliency map set 335. Additionally or alternatively, each ROI ensemble included in the ensemble set 345 includes multiple ROIs that are determined based on areas of salient visual content indicated in the respective saliency map. For convenience, and not by way of limitation, a reproduction of the image 310 is depicted with each ensemble in the ROI ensemble set 345, indicating locations of the multiple ROIs relative to the image 310.

The ROI ensemble set 345 includes an object ROI ensemble 345C that is generated based on the object saliency map 335C, and an eye fixation ROI ensemble 345F that is generated based on the eye fixation saliency map 335F. The object ROI ensemble 345C includes an ROI 347A and an ROI 347B, which are each determined based on the object area 337A (e.g., the shape of the adult dog); and also includes an ROI 347C, which is determined based on the object area 337B (e.g., the shape of the puppy). The eye fixation ROI ensemble 345F includes an ROI 349A, which is determined based on the fixation area 339B (e.g., the tail of the adult dog); an ROI 349B and an ROI 349C, which are each determined based on the fixation area 339A (e.g., the face of the adult dog); and an ROI 349D, which is determined based on the fixation area 339C (e.g., the face of the puppy). In some embodiments, an ROI in a particular ROI ensemble may be one or more of overlapping with, nested in, adjacent to, or separate from one or more additional ROIs in the particular ROI ensemble.

For convenience, and not by way of limitation, the ROIs 347A through 347C and 349A through 349D are depicted as rectangular boundaries, but other embodiments are possible. For example, an ROI may encompass an area that is circular, triangular, polyhedral (including of orders higher than rectangular), an irregular shape, or having any other suitable shape. In some embodiments, an ROI ensemble that includes ROIs having a same quantity of edges and/or corners (e.g., rectangular) provides improvements in accuracy or speed for evaluation of crop candidates. For example, if a crop generation system generates multiple crop candidates having rectangular shapes and an ensemble of ROIs having rectangular shapes, corner coordinates of the multiple crop candidates are rapidly and accurately evaluated based on corner coordinates of the ROIs in the ensemble.

For convenience, and not by way of limitation, the ROIs 347A through 347C and 349A through 349D are depicted graphically, but other embodiments are possible. For example, one or more of an ROI or an ROI ensemble may be represented as a set of numeric values, as a database record, or other suitable data structures (including data structures not intended for human interpretation).

Figure 5:
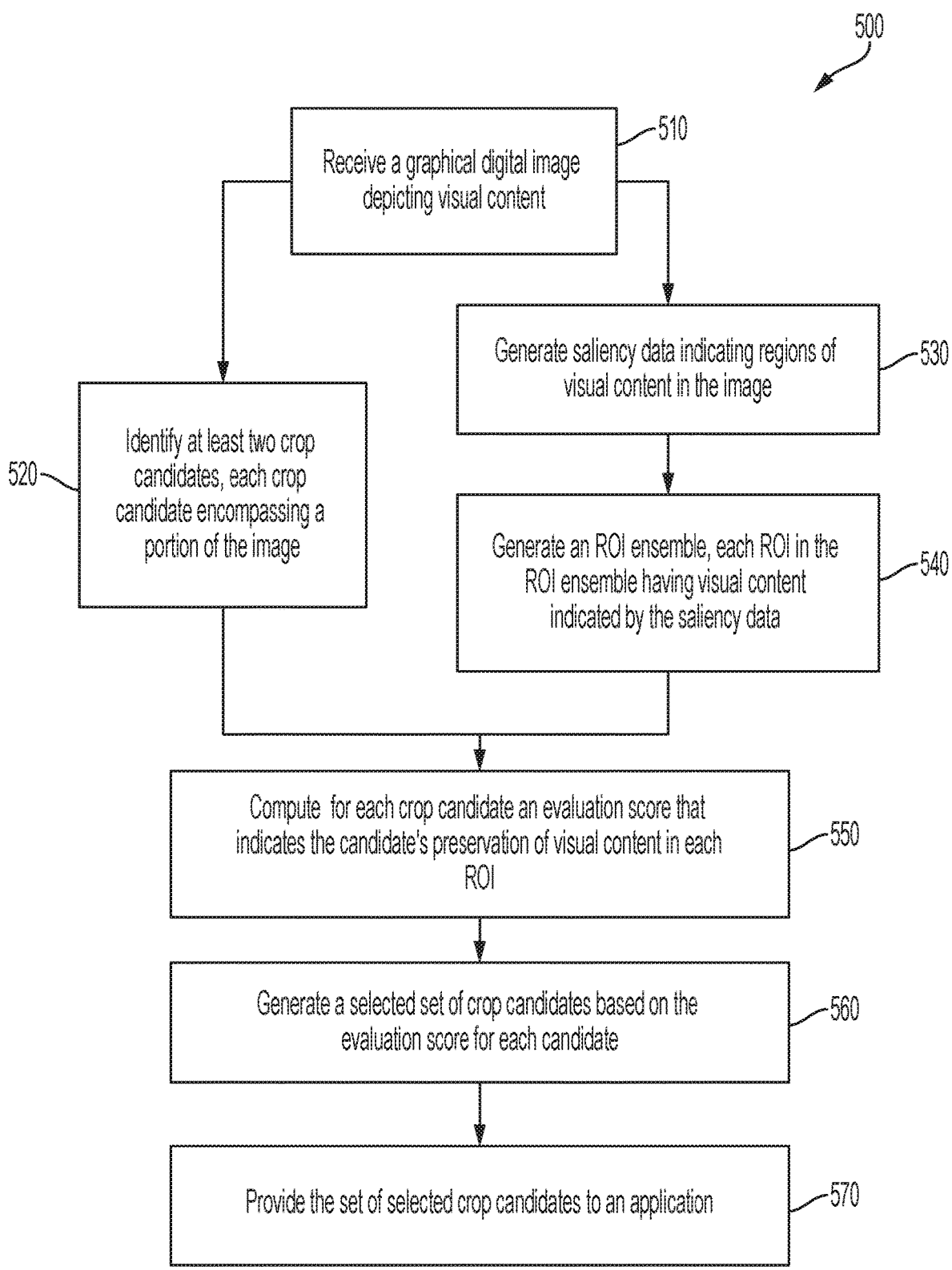
FIG. 5 is a flow chart depicting an example of a process for evaluating a group of crop candidates, according to certain embodiments.

FIG. 5 is a flow chart depicting an example of a process 500 for evaluating a group of crop candidates. In some embodiments, such as described in regards to FIGS. 1-4, a computing device executing a crop generation system implements operations described in FIG. 5, by executing suitable program code. For illustrative purposes, the process 500 is described with reference to the examples depicted in FIGS. 1-4. Other implementations, however, are possible.

At block 510, the process 500 involves receiving a graphical digital image that depicts visual content, such as a digital photograph. For example, a crop generation system, such as the crop generation system 100, receives an image from an additional computing system, such as the camera device 105, the image editing application 180, or the image repository 102. The image includes multiple pixels that represent the visual content, for example, based on the color, location, or relative arrangement of the pixels.

At block 520, the process 500 involves identifying at least two crop candidates based on the image. Each of the multiple crop candidates encompasses a respective portion of the image, such that each candidate encompasses a respective portion of the visual content. For example, a crop candidate generation module in the crop generation system generates a pool of crop candidates, such as the crop candidate pool 225 generated by the crop candidate generation module 220. In some cases, the crop candidates are generated based on one or more criteria, such as the crop criteria 107. In some cases, the crop candidate pool includes a first crop candidate and a second crop candidate. The first candidate encompasses a first portion of the image that depicts visual content. Additionally or alternatively, the second candidate encompasses a second portion of the image that depicts additional visual content. In some cases, the first and second candidates encompass different portions of the image. Additionally or alternatively, part of the encompassed portions could be identical, and an additional part could be different. For example, the first and second candidates could encompass respective portions that overlap, are separated, or are nested.

At block 530, the process 500 involves generating saliency data based on the image. The saliency data indicates regions of salient visual content in the image. For example, a saliency map generation module, such as the saliency map generation module 230, generates one or more of an eye fixation saliency map or an object saliency map. In some cases, the eye fixation saliency map indicates areas of the image that are likely to draw the attention of a viewer. Additionally or alternatively, the object saliency map indicates areas that represent an object depicted in the image.

At block 540, the process 500 involves generating one or more ROI ensembles based on the saliency data. For example, an ROI ensemble generation module, such as the ensemble generation module 240, generates one or more of an eye fixation ROI ensemble or an object ROI ensemble. Each ROI included in the ROI ensemble encompasses (or otherwise represents) a portion of the visual content included in the image. In some cases, the ROI ensemble includes a first ROI and a second ROI. The first ROI encompasses a first portion of the image that depicts visual content indicated by the saliency data. Additionally or alternatively, the second ROI encompasses a second portion of the image that depicts additional visual content indicated by the saliency data. In some cases, the first and second ROIs encompass different visual content. Additionally or alternatively, part of the visual content could be identical, and an additional part could be different. For example, the first and second ROIs could encompass respective portions of visual content that overlap, are separated, or are nested.

In some implementations of the process 500, one or more operations related to block 520 are performed in parallel with operations related to one or more of the blocks 530 or 540. Additionally or alternatively, one or more operations related to block 520 are performed sequentially with operations related to one or more of the blocks 530 or 540. For instance, the example crop generation system could generate a crop candidate pool prior to or subsequent to generating saliency data and an ROI ensemble, or the crop candidate pool could be generated in parallel with one or more of the saliency data or ROI ensemble.

At block 550, the process 500 involves computing an evaluation score for one or more respective crop candidates in the crop candidate pool. The evaluation score indicates a preservation, by the respective crop candidate, of the combination of visual content that is included in the ROIs in the ROI ensemble. For example, a crop candidate evaluation module, such as the crop candidate evaluation module 250, calculates a first evaluation score for the first crop candidate and a second evaluation score for the second crop candidate. In some cases, each evaluation score is based on multiple component scores that indicate whether the respective crop candidate accurately preserves a particular characteristic of the combination of the visual content. For example, a particular evaluation score is based on a content preservation score that indicates a degree to which the respective crop candidate preserves the presence of salient visual content in the image. Additionally or alternatively, the particular evaluation score is based on a composition preservation score that indicates a degree to which the respective crop candidate preserves the relative location(s) of salient visual content in the image. In some cases, each evaluation score for a respective crop candidate is based on a combination of the respective content preservation score and composition preservation score for the respective crop candidate.

At block 560, the process 500 involves generating a selected set of crop candidates based on the evaluation scores. For example, the evaluation module compares the evaluation scores to one or more thresholds. Additionally or alternatively, a set of selected crop candidates, such as the selected candidates 270, is generated based on the comparison of each evaluation score. The set of selected candidates includes, for example, one or more crop candidates having an evaluation score above (or having another relation to) an evaluation threshold.

At block 570, the process 500 involves providing the selected set of crop candidates to one or more software applications implemented in a computing environment(s). For example, the crop generation system provides the selected candidates to an image editing application, such as the image editing application 180. In some cases, the software application modifies the image (or a copy of the image) based on one or more of the selected candidates. Additionally or alternatively, the selected candidates are provided to a user via a user interface. For example, the image editing application could provide the selected candidates on a display device, such as a display associated with the camera device 105 or an additional personal computing device.

In some embodiments, one or more operations related to one or more of blocks 530, 540, or 550 are repeated for multiple types of saliency data, such as object saliency data and eye fixation saliency data. For example, operations related to generating saliency data and generating an ROI ensemble are performed for an object saliency map and for an eye fixation saliency map. Additionally or alternatively, some operations related to computing an evaluation score for a particular crop candidate are performed based on one or more of an object ROI ensemble or an eye fixation ROI ensemble. Furthermore, some operations related to computing an evaluation score for a particular crop candidate are performed for multiple crop candidates from the candidate pool.

In some embodiments, one or more operations related to one or more of blocks 550 or 560 are repeated for a subset of crop candidates. For example, the evaluation module calculates an evaluation score for each of the crop candidates in the generated candidate pool. Additionally or alternatively, the evaluation module calculates an evaluation score for a subset of crop candidates from the generated candidate pool (e.g., omitting calculations for candidates excluded from the subset). For example, a first component score, such as a content preservation score, is calculated for each candidate in the generated candidate pool. A modified candidate pool is generated based on a subset of candidates having respective content preservation scores that fulfill a content threshold. A second component score, such as a composition preservation score, is calculated for each candidate in the modified candidate pool. In some cases, an additional modified candidate pool is generated based on another subset of candidates having respective composition preservation scores that fulfill a composition threshold. In some embodiments of the example crop generation system, an evaluation score is calculated for each candidate in the subset of crop candidates from the modified candidate pool, or from the additional modified candidate pool.

Saliency Data Generation Techniques

In a crop generation system, such as the crop generation system 200, saliency data for an image is determined based on a suitable saliency-detection technique. For example, a saliency map generation module in the crop generation system could include one or more neural networks that are configured to determine saliency data based on deep learning models. Additionally or alternatively, a saliency map generation module could receive saliency data, such as from an additional computing system configured with one or more neural networks trained to determine the saliency data.

In some cases, the saliency data includes multiple saliency maps associated with the image, such as saliency maps as described in regards to FIGS. 1-5. For example, the saliency data includes an object saliency map that includes at least one object area (or "cutout"), i.e., data indicating a location of one or more objects depicted in the image. The object area is represented, for example, by one or more pixels, numeric values, or other data types or data structures in the object saliency map. For convenience, and not by way of limitation, an object saliency map is designated herein as a map C or an object saliency map C. In some cases, an object saliency map C includes a digital mask having black-and-white pixel data, such that an object area is indicated by one or more pixels having a value of 1 and an additional area (e.g., an area that does not depict an object) is indicated by one or more pixels having a value of 0.

Additionally or alternatively, the saliency data includes an eye fixation map that includes at least one fixation area, i.e., data indicating a location of an area that is likely to draw the attention of a viewer of the image. The fixation area is represented, for example, by one or more pixels, numeric values, or other data types or data structures in the eye fixation saliency map. For convenience, and not by way of limitation, an eye fixation saliency map is designated herein as a map F or an eye fixation saliency map F.

In some embodiments of an example crop generation system, at least one post-processing stage is applied to saliency data, such as a scene determination stage or a region suppression stage. For example, a saliency map generation module (such as the saliency map generation module 230) is configured to apply a scene determination neural network model to the image. Based on the scene determination neural network model, the saliency map generation module determines a scene type of the image, such a portrait, an action shot (e.g., depicting motion), a landscape, an abstract, or another suitable type of scene depicted by visual content in the image. Additionally or alternatively, the saliency map generation module determines a dominant object in the image (e.g., an object that has a location, size, or other characteristic indicating an artistic importance). In some cases, operations related to determining the dominant object are performed based on an output from the scene determination neural network model. For example, the saliency map generation module could be configured to determine the dominant object responsive to an output indicating a portrait scene type, and further configured to omit the dominant object determination responsive to an output indicating a landscape scene type.

In some cases, if the image has a dominant object, the saliency map generation module is configured to apply region suppression to one or more of the saliency maps. Equation 1 provides an example of a technique for region suppression.

$$F' = F \odot C \qquad \text{Eq. 1}$$

In Equation 1, a modified eye fixation saliency map F' is generated based on a pixel-wise multiplication of the eye fixation saliency map F and the object saliency map C. For example, a pixel at a particular location in the eye fixation saliency map F is multiplied by a corresponding pixel having the same location in the object saliency map C. If the pixel in the object saliency map C indicates an object (e.g., has a value of 1), the corresponding pixel in modified eye fixation saliency map F' will have the same value as the pixel in map F. If the pixel in the object saliency map C indicates no object (e.g., has a value of 0), the corresponding pixel in modified eye fixation saliency map F' will have a value of 0. As a non-limiting example, if the image depicts a person and also a reflection on a nearby window, the object saliency map C could indicate an object area for the person and the eye fixation saliency map F could indicate a first fixation area for the person's face and a second fixation area for the reflection. Responsive to a determination that the person is a dominant object in the example image, the example saliency map generation module could perform region suppression based on Equation 1, via which pixels for the reflection fixation area (e.g., outside of the person object area) are modified to have a value of zero. In some cases, a crop generation system that is configured to apply scene determination or region suppression provides a selection of crop candidates that more accurately represent the visual content of an image, such as by evaluating and selecting candidates based on one or more of a scene type or dominant object.

Region-of-Interest Ensemble Generation Techniques

In a crop generation system, such as the crop generation system 200, an ROI ensemble for an image is determined based on an analysis of saliency data for the image. For example, an ROI ensemble generation module in the crop generation system could compare values of pixels in a saliency map to an ROI threshold value. In some cases, an ROI ensemble is determined based on an analysis of a modified saliency map, such as a modified eye fixation saliency map F'. In some embodiments, the ROI ensemble generation module determines a respective ROI ensemble based on a respective ROI threshold value. For example, an object ROI ensemble could be determined based on a comparison of pixels in an object saliency map C to an object ROI threshold $\theta_C$. Additionally or alternatively, an eye fixation ROI ensemble could be determined based on a comparison of pixels in an eye fixation saliency map F to an eye fixation ROI threshold $\theta_F$.

For convenience, and not by way of limitation, an object ROI ensemble is designated herein as an ensemble $R_c$ or an object ROI ensemble $R_c$. Additionally or alternatively, the object ROI ensemble $R_c$ includes a set of n ROIs, such that the ensemble $R_c = \{r_i, i=1 \ldots n\}$.

For convenience, and not by way of limitation, an eye fixation ROI ensemble is designated herein as an ensemble $R_f$ or an eye fixation ROI ensemble $R_f$. Additionally or alternatively, the eye fixation ROI ensemble $R_f$ includes a set of m ROIs, such that the ensemble $R_f \{r_j, j=1 \ldots m\}$. In some cases, n and m may (but need not necessarily) be equal, such that ensembles $R_c$ and $R_f$ may (but need not necessarily) have an equivalent quantity of ROIs.

Content Preservation Scoring Techniques

In a crop generation system, such as the crop generation system 200, an evaluation score for a particular crop candidate is determined based on one or more component scores, such as a content preservation score or a composition preservation score. For example, a crop candidate evaluation module in the crop generation system computes at least one content preservation score for a crop candidate for an image, based on comparisons of the crop candidate to at least one ROI ensemble associated with the image. Additionally or alternatively, the content preservation score indicates whether the particular crop candidate provides coverage of salient visual content in the image. In some cases, multiple content preservation scores (e.g., $F_P$) are determined for a crop candidate c, such as an object content preservation score $F_{Pc}(R_c, c)$ indicating coverage of content in an object ROI ensemble $R_c$ and an eye fixation content preservation score $F_{Pf}(R_f, c)$ indicating coverage of content in an eye fixation ROI ensemble $R_f$.

An example content preservation function for determining coverage, by a crop candidate c, of content in the object ROI ensemble $R_c = \{r_i, i=1 \ldots n\}$ is provided in the example Equation 2. An example function for determining proportional coverage by the crop candidate c for a particular ROI $r_i$ is provided in the example Equation 3.

$$F_{Pc}(R_c, c) = \frac{n \sum_{i=1}^{n} \delta(I(r_i, c) = 1) + \sum_{i=1}^{n} I(r_i, c)}{n^2 + n} \quad \text{Eq. 2}$$

-continued $$I(r_i, c) = \frac{\text{Overlap}(r_i, c)}{\text{Area}(r_i)} \quad \text{Eq. 3}$$

In Equation 2, the object content preservation score $F_{Pc}(R_c, c)$ is based on a first term indicating a sum of how many of the ROIs $r_i$ are covered completely by the crop candidate c, and a second term indicating a sum of proportional coverages for all of the ROIs $r_i$ by the crop candidate c. In some cases, a sum based on the first term and the second term is normalized, such as dividing by the quantity n of the ROIs $r_i$ summed with the square of the ROI quantity n. The proportional coverage term $I(r_i, c)$, as described in the example Equation 3, indicates a ratio of how much area of a particular ROI $r_i$ is covered by the crop candidate c, compared to the total area of the particular ROI $r_i$. To aid understanding, and not by way of limitation, a value of the object content preservation score $F_{Pc}(R_c, c)$ is increased if the crop candidate c completely covers a relatively large number of the ROIs $r_i$ (e.g., such as indicated by the first term). Furthermore, the value of the object content preservation score $F_{Pc}(R_c, c)$ is increased if the crop candidate c covers a relatively large proportion of a relatively large number of the ROIs $r_i$ (e.g., such as indicated by the second term).

In Equation 2, the first term includes a summation term $$\sum_{i=1}^{n} \delta(I(r_i, c) = 1)$$

that is multiplied by the ROI quantity n. The sigma function $\delta(I(r_i, c)=1)$ is valued at 1 if the proportional coverage term $I(r_i, c)$ is equal to 1, i.e., if the entire area of the particular ROI $r_i$ is covered by the crop candidate c. In addition, the sigma function $\delta(I(r_i, c)=1)$ is valued at 0 if the proportional coverage term $I(r_i, c)$ is less than 1, i.e., if the crop candidate c covers less than the entire area of the particular ROI $r_i$. In Equation 2, the first term has an increased value if the crop candidate c completely covers the areas of a relatively large number of the ROIs $r_i$. In some cases, the first term has a maximum value of $n^2$, such as if the sigma function $\delta(I(r_i, c)=1)$ is valued at 1 for all n of the ROIs, and the summed total of the sigma function is multiplied by the ROI quantity n.

In Equation 2, the second term includes a summation term $$\sum_{i=1}^{n} I(r_i, c).$$

The proportional coverage term $I(r_i, c)$ is summed for all of the ROIs $r_i$. In Equation 2, the second term has an increased value if the crop candidate c covers a relatively large proportion of the areas of a relatively large number of the ROIs $r_i$. In some cases, the second term has a maximum value of n, such as if the proportional coverage term $I(r_i, c)$ is 1 (e.g., indicates complete coverage) for all n of the ROIs.

In Equation 2, a maximum value of the dividend is $n^2 + n$, based on the maximum values of the first terms and second terms. In some cases, the sum of the first and second terms is normalized, such as normalization based on the divisor $n^2 + n$. As provided by the example Equation 2, a maximum value for the object content preservation score $F_{Pc}(R_c, c)$ is 1. To aid understanding, and not by way of limitation, the object content preservation score $F_{Pc}(R_c, c)$ has a value of 1 if the crop candidate c completely covers all of the object ROIs $r_i$ that are included in the object ROI ensemble $R_c$.

In some embodiments of the example crop generation system, the content preservation score is based on the object content preservation score $F_{Pc}(R_c, c)$, such as described in regards to Equations 2 and 3. Additionally or alternatively, the content preservation score is based on the eye fixation content preservation score $F_{Pf}(R_f, c)$. An example content preservation function for determining coverage, by the crop candidate c, of content in the eye fixation ensemble $R_f$ $\{r_j, j=1 \ldots m\}$ is provided in the example Equation 4. An example function for determining proportional coverage by the crop candidate c for a particular ROI $r_j$ is provided in the example Equation 5.

$$F_{Pf}(R_f, c) = \frac{m \sum_{j=1}^{m} \delta(I(r_j, c) = 1) + \sum_{j=1}^{m} I(r_j, c)}{m^2 + m} \quad \text{Eq. 4}$$

$$I(r_j, c) = \frac{\text{Overlap}(r_j, c)}{\text{Area}(r_j)} \quad \text{Eq. 5}$$

In Equation 4, the eye fixation content preservation score $F_{Pf}(R_f, c)$ is based on a first term indicating a sum of how many of the ROIs $r_j$ are covered completely by the crop candidate c, and a second term indicating a sum of proportional coverages for all of the ROIs $r_j$ by the crop candidate c. In some cases, a sum based on the first term and the second term is normalized, such as dividing by the quantity m of the ROIs $r_j$ summed with the square of the ROI quantity m. The proportional coverage term $I(r_j, c)$, as described in the example Equation 5, indicates a ratio of how much area of a particular ROI $r_j$ is covered by the crop candidate c, compared to the total area of the particular ROI $r_j$. To aid understanding, and not by way of limitation, a value of the eye fixation content preservation score $F_{Pf}(R_f, c)$ is increased if the crop candidate c completely covers a relatively large number of the ROIs $r_j$ (e.g., such as indicated by the first term). Furthermore, the value of the eye fixation content preservation score $F_{Pf}(R_f, c)$ is increased if the crop candidate c covers a relatively large proportion of a relatively large number of the ROIs $r_j$ (e.g., such as indicated by the second term).

In Equation 4, the first term includes a summation term $$\sum_{j=1}^{m} \delta(I(r_j, c) = 1)$$

that is multiplied by the ROI quantity m. The sigma function $\delta(I(r_j, c)=1)$ is valued at 1 if the proportional coverage term $I(r_j, c)$ is equal to 1, i.e., if the entire area of the particular ROI $r_j$ is covered by the crop candidate c. In addition, the sigma function $\delta(I(r_j, c)=1)$ is valued at 0 if the proportional coverage term $I(r_j, c)$ is less than 1, i.e., if the crop candidate c covers less than the entire area of the particular ROI $r_j$. In Equation 4, the first term has an increased value if the crop candidate c completely covers the areas of a relatively large number of the ROIs $r_j$. In some cases, the first term has a maximum value of $m^2$, such as if the sigma function $\delta(I(r_j, c)=1)$ is valued at 1 for all m of the ROIs, and the summed total of the sigma function is multiplied by the ROI quantity m.

In Equation 4, the second term includes a summation term $$\sum_{j=1}^{m} I(r_j, c).$$

The proportional coverage term $I(r_j, c)$ is summed for all of the ROIs $r_j$. In Equation 4, the second term has an increased value if the crop candidate c covers a relatively large proportion of the areas of a relatively large number of the ROIs $r_j$. In some cases, the second term has a maximum value of m, such as if the proportional coverage term $I(r_j, c)$ is 1 (e.g., indicates complete coverage) for all m of the ROIs.

In Equation 4, a maximum value of the dividend is $m^2+m$, based on the maximum values of the first terms and second terms. In some cases, the sum of the first and second terms is normalized, such as normalization based on the divisor $m^2+m$. As provided by the example Equation 4, a maximum value for the eye fixation content preservation score $F_{Pf}(R_f, c)$ is 1. To aid understanding, and not by way of limitation, the eye fixation content preservation score $F_{Pf}(R_f, c)$ has a value of 1 if the crop candidate c completely covers all of the eye fixation ROIs $r_j$ that are included in the eye fixation ROI ensemble $R_f$.

Composition Preservation Scoring Techniques

In a crop generation system, such as the crop generation system 200, an evaluation score for a particular crop candidate is determined based on one or more component scores, such as a content preservation score or a composition preservation score. For example, a crop candidate evaluation module in the crop generation system computes at least one composition preservation score for a crop candidate for an image, based on comparisons of the crop candidate to at least one ROI ensemble associated with the image. Additionally or alternatively, the composition preservation score indicates whether the particular crop candidate preserves the original composition of the image. In regards to the example crop generation system, the term composition refers to spatial relations between a portion of the image and the entirety of the image, or between multiple portions of the image. In some cases, the composition of an image conveys an artistic intent or emotional response to a viewer of the image. For instance, a non-limiting example image may depict visual content of a person sitting on a beach by an ocean. A first composition of the example image could include the person centered in the image with the ocean visible in the periphery, and the first composition could convey an emotional response of rest and relaxation. A second composition of the example image could include the ocean centered in the image with the person visible in the periphery, and the second composition could convey an emotional response of loneliness. In some cases, a crop candidate that preserves the composition of an image more accurately represents the image as compared to a crop candidate that does not preserve the composition, such as by more accurately representing an artistic intent of the photographer.

Figure 6:
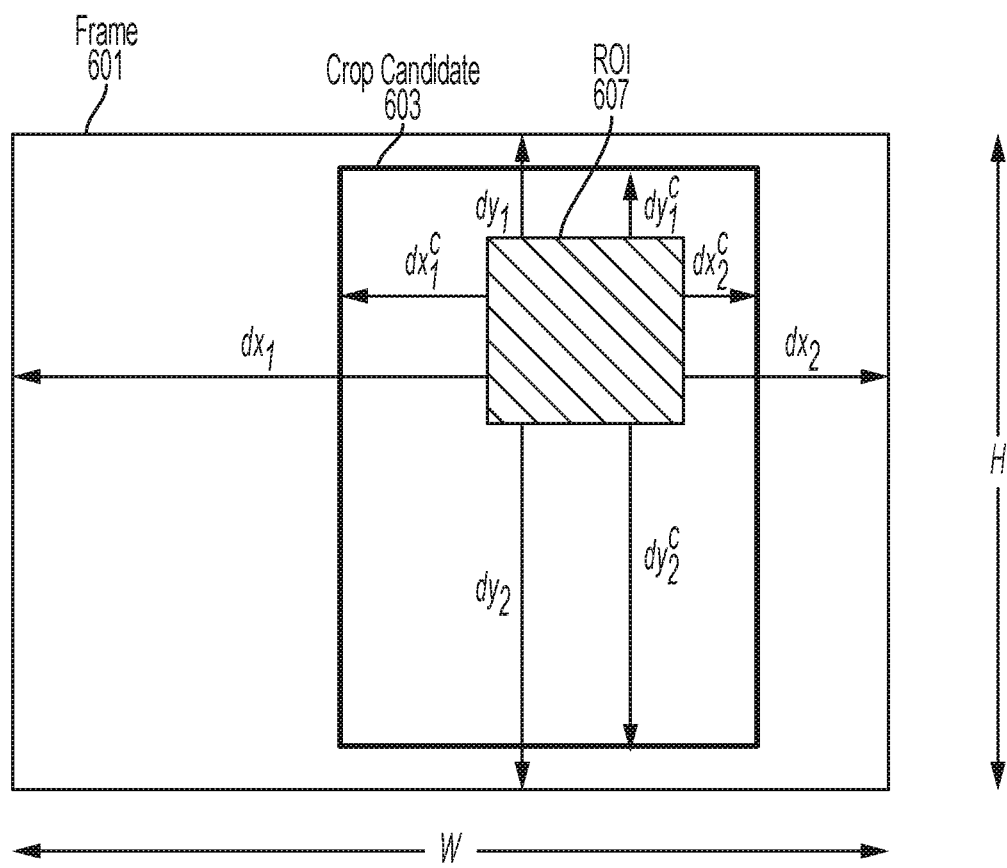
FIG. 6 is a diagram depicting some aspects of example techniques for determining composition preservation, according to certain embodiments.

In some cases, multiple composition preservation scores (e.g., $F_C$) are determined for a crop candidate c, such as an object composition preservation score $F_{Cc}(R_c, c, I)$ indicating composition preservation for an object ROI ensemble $R_c$ and an eye fixation composition preservation score $F_{Cf}(R_f, c, I)$ indicating composition preservation for an eye fixation ROI ensemble $R_f$. An example composition preservation function for determining composition similarities of the crop candidate c with respect to the object ROI ensemble $R_c=\{r_i, i=1 \ldots n\}$ is provided in the example Equation 6. An example composition preservation function for determining composition similarities of the crop candidate c with respect to the eye fixation ROI ensemble $R_f=\{r_j, j=1 \ldots m\}$ is provided in the example Equation 7. To aid understanding, and not by way of limitation, FIG. 6 is a diagram depicting some aspects of techniques for determining composition preservation.

$$F_{Cc}(R_c, c, I) = \frac{1}{n}\sum_{i=1}^{n} \min\{\mathcal{H}(r_i, c, I), \mathcal{V}(r_i, c, I)\} \quad \text{Eq. 6}$$

$$F_{Cf}(R_f, c, I) = \frac{1}{m}\sum_{j=1}^{m} \min\{\mathcal{H}(r_j, c, I), \mathcal{V}(r_j, c, I)\} \quad \text{Eq. 7}$$

In Equations 6 and 7, a frame I is a bounding box that encompasses all of the ROIs included in, respectively, the object ROI ensemble $R_c$ and the eye fixation ROI ensemble $R_f$. For example, the borders of an image constitute a frame. Additionally or alternatively, a tightly-fit bounding box encompassing the ROIs in an ensemble without encompassing additional (e.g., non-ROI) visual content of the image also constitutes a frame. In some embodiments of a crop generation system, a frame indicates a boundary of visual content in an image. As a non-limiting example, if an image has skewed or damaged visual content (e.g., the camera device was not correctly prepared during photography), a frame that is smaller than the image provides an indication of the visual content. In FIG. 6, an ROI 607 is encompassed by a crop candidate 603, and the ROI 607 and the crop candidate 603 are each encompassed by a frame 601.

In Equation 6, the object composition preservation score $F_{Cc}(R_c, c, I)$ is based on a summation of a minimum of a horizontal composition term and a vertical composition term for all object ROIs $r_i$ that are included in the object ROI ensemble $R_c = \{r_i, i=1 \ldots n\}$. The sum of the minimum terms for the object ROI ensemble $R_c$ is divided by the quantity n of the ROIs $r_i$ included in the ensemble $R_C$. In Equation 7, the eye fixation composition preservation score $F_{Cf}(R_f, c, I)$ is based on a summation of a minimum of a horizontal composition term and a vertical composition term for all eye fixation ROIs $r_j$ that are included in the eye fixation ROI ensemble $R_f = \{r_j, j=1 \ldots m\}$. The sum of the minimum terms for the eye fixation ROI ensemble $R_f$ is divided by the quantity m of the ROIs $r_j$ included in the ensemble $R_f$. To aid understanding, and not by way of limitation, a value of the object composition preservation score $F_{Cc}(R_c, c, I)$ is increased if the crop candidate c has a relatively small horizontal composition term or vertical composition term value for a relatively large number of the object ROIs $r_i$. Furthermore, a value of the eye fixation composition preservation score $F_{Cf}(R_f, c, I)$ is increased if the crop candidate c has a relatively small horizontal composition term or vertical composition term value for a relatively large number of the eye fixation ROIs $r_j$.

In Equation 6 the object composition preservation score $F_{Cc}(R_c, c, I)$ is based on a horizontal composition term $\mathcal{H}(r_i, c, I)$ and a vertical composition term $\mathcal{V}(r_i, c, I)$. The horizontal composition term $\mathcal{H}(r_i, c, I)$ indicates a similarity of the horizontal centeredness of the object ROI $r_i$ within the crop candidate c compared to the horizontal centeredness of the ROI $r_i$ within the frame I. The vertical composition term $\mathcal{V}(r_i, c, I)$ indicates a similarity of the vertical centeredness of the ROI $r_i$ within the crop candidate c compared to the vertical centeredness of the ROI $r_i$ within the frame I. An example function for determining the horizontal composition term $\mathcal{H}(r_i, c, I)$ is provided in the example Equation 8, and an example function for determining the vertical composition term $\mathcal{V}(r_i, c, I)$ is provided in the example Equation 9.

$$\mathcal{H}(r_i, c, I) = \quad \text{Eq. 8}$$
$$\begin{cases} \exp\left(-\frac{dx_1}{W}\left(\frac{dx_2}{dx_1} - \frac{dx_2^c}{dx_1^c}\right)^2 - \frac{dx_2}{W}\left(\frac{dx_1}{dx_2} - \frac{dx_1^c}{dx_2^c}\right)^2\right) & \text{If } c \text{ fully covers } r_i \\ 0 & \text{otherwise} \end{cases}$$

$$\mathcal{V}(r_i, c, I) = \quad \text{Eq. 9}$$
$$\begin{cases} \exp\left(-\frac{dy_1}{H}\left(\frac{dy_2}{dy_1} - \frac{dy_2^c}{dy_1^c}\right)^2 - \frac{dy_2}{H}\left(\frac{dy_1}{dy_2} - \frac{dy_1^c}{dy_2^c}\right)^2\right) & \text{If } c \text{ fully covers } r_i \\ 0 & \text{otherwise} \end{cases}$$

In Equation 7, the eye fixation composition preservation score $F_{Cf}(R_f, c, I)$ is based on a horizontal composition term $\mathcal{H}(r_j, c, I)$ and a vertical composition term $\mathcal{V}(r_j, c, I)$. The horizontal composition term $\mathcal{H}(r_j, c, I)$ indicates a similarity of the horizontal centeredness of the eye fixation ROI $r_j$ within the crop candidate c compared to within the frame I, and the vertical composition term $\mathcal{V}(r_j, c, I)$ indicates a similarity of the vertical centeredness of the ROI r within the crop candidate c compared to within the frame I. An example function for determining the horizontal composition term $\mathcal{H}(r_j, c, I)$ is provided in the example Equation 10, and an example function for determining the vertical composition term $\mathcal{V}(r_j, c, I)$ is provided in the example Equation 11.

$$\mathcal{H}(r_j, c, I) = \quad \text{Eq. 10}$$
$$\begin{cases} \exp\left(-\frac{dx_1}{W}\left(\frac{dx_2}{dx_1} - \frac{dx_2^c}{dx_1^c}\right)^2 - \frac{dx_2}{W}\left(\frac{dx_1}{dx_2} - \frac{dx_1^c}{dx_2^c}\right)^2\right) & \text{If } c \text{ fully covers } r_j \\ 0 & \text{otherwise} \end{cases}$$

$$\mathcal{V}(r_j, c, I) = \quad \text{Eq. 11}$$
$$\begin{cases} \exp\left(-\frac{dy_1}{H}\left(\frac{dy_2}{dy_1} - \frac{dy_2^c}{dy_1^c}\right)^2 - \frac{dy_2}{H}\left(\frac{dy_1}{dy_2} - \frac{dy_1^c}{dy_2^c}\right)^2\right) & \text{If } c \text{ fully covers } r_j \\ 0 & \text{otherwise} \end{cases}$$

In Equations 8 through 11, the term W is the width of the frame I, and the term H is the height of the frame I. FIG. 6 provides an indication of the example dimensions width W and height H of the frame 601. In some embodiments of a crop generation system, the frame I (e.g., the frame 601) has width and height dimensions that are identical to the dimensions of the image for which the crop candidates are generated (e.g., image 210). Additionally or alternatively, the frame I (e.g., the frame 601) has at least one of a width or height that is smaller than the respective dimension of the image, and also larger than the ensemble of ROIs included in, respectively, the object ROI ensemble $R_c$ or the eye fixation ROI ensemble $R_f$. In some cases, the Equations 8 through 11 use a particular frame I. Additionally or alternatively, multiple frames are used, such that the object composition preservation score $F_{Cc}(R_c, c, I)$ is determined based on a first frame having first dimensions and the eye fixation composition preservation score $F_{Cf}(R_f, c, I)$ is determined based on a second frame having one or more dimensions that are different from the first dimensions.

In Equations 8 through 11, the horizontal composition terms and the vertical composition terms are calculated based on a determination of the coverage of the ROI $r_i$ (or the ROI $r_j$) by the crop candidate c. If the crop candidate c does not cover the entirety of the ROI, the horizontal composition terms and the vertical composition terms are calculated to be 0. To aid understanding, and not by way of limitation, if an example crop candidate does not cover an example ROI in an image, the example crop candidate could fail to represent the original composition of the image with respect to the example ROI, and a horizontal (or vertical) composition term for the example crop candidate could be calculated as 0 with respect to the example ROI.

If the crop candidate c does cover the entirety of the ROI, the horizontal composition terms and the vertical composition terms are calculated based on a difference between distance ratios. For the horizontal composition terms $\mathcal{H}(r_i, c, I)$ and $\mathcal{H}(r_j, c, I)$, the distance ratios are based on: a left frame distance $dx_1$ from a left edge of the ROI to a left edge of the frame I; a right frame distance $dx_2$ from a right edge of the ROI to a right edge of the frame I; a left crop distance $dx_1^c$ from the left edge of the ROI to a left edge of the crop candidate c; and a right crop distance $dx_2^c$ from the right edge of the ROI to a right edge of the crop candidate c. For the vertical composition terms $\mathcal{V}(r_i, c, I)$ and $\mathcal{V}(r_j, c, I)$, the distance ratios are based on: a top frame distance $dy_1$ from a top edge of the ROI to a top edge of the frame I; a bottom frame distance $dy_2$ from a bottom edge of the ROI to a bottom edge of the frame I; a top crop distance $dy_1^c$ from the top edge of the ROI to a top edge of the crop candidate c; and a bottom crop distance $dy_2^c$ from the bottom edge of the ROI to a bottom edge of the crop candidate c. FIG. 6 depicts examples of the frame distances and crop distances for an example configuration of the frame 601, crop candidate 603, and ROI 607.

The Equations 8 and 10 include a first horizontal term $$\left(\frac{dx_2}{dx_1} - \frac{dx_2^c}{dx_1^c}\right)^2$$

that indicates a squared difference between a ratio of the right frame distance $dx_2$ to the left frame distance $dx_1$, and a ratio of the right crop distance $dx_2^c$ to the left crop distance $dx_1^c$. The Equations 8 and 10 also include a second horizontal term $$\left(\frac{dx_1}{dx_2} - \frac{dx_1^c}{dx_2^c}\right)^2$$

that indicates a squared difference between a ratio of the left frame distance $dx_1$ to the right frame distance $dx_2$, and a ratio of the left crop distance $dx_1^c$ to the right crop distance $dx_2^c$. The Equations 9 and 11 include a first vertical term $$\left(\frac{dy_2}{dy_1} - \frac{dy_2^c}{dy_1^c}\right)^2$$

that indicates a squared difference between a ratio of the bottom frame distance $dy_2$ to the top frame distance $dy_1$, and a ratio of the bottom crop distance $dy_2^c$ to the top crop distance $dy_1^c$. The Equations 9 and 11 also include a second vertical term $$\left(\frac{dy_1}{dy_2} - \frac{dy_1^c}{dy_2^c}\right)^2$$

that indicates a squared difference between a ratio of the top frame distance $dy_1$ to the bottom frame distance $dy_2$, and a ratio of the top crop distance $dy_1^c$ to the bottom crop distance $dy_2^c$. Although Equations 8 through 11 include horizontal and vertical terms having a squared difference, other implementations are possible, such as terms having an absolute difference (e.g., $$\left|\left(\frac{dx_2}{dx_1} - \frac{dx_2^c}{dx_1^c}\right)\right|$$

as an example horizontal term having an absolute difference).

To aid understanding, and not by way of limitation, the first and second horizontal and vertical terms each has a value that is decreased if the ROI has a very similar location (e.g., horizontal centeredness, vertical centeredness) within the crop candidate c as compared to within the frame I. In some cases, subtraction of the second horizontal term from the first horizontal term indicates whether the ROI has a central horizontal location in the image or a peripheral horizontal location in the image. Furthermore, subtraction of the second vertical term from the first vertical term indicates whether the ROI has a central vertical location in the image or a peripheral vertical location in the image. For example, if an example ROI is horizontally close to the center of an example image, a difference of the first and second horizontal terms could have a value close to zero, and the horizontal composition term $\mathcal{H}(r_i, c, I)$ or $\mathcal{H}(r_j, c, I)$ could have a value that is close to zero. Additionally or alternatively, if the example ROI is vertically close to the center of the example image, a difference of the first and second vertical terms could have a value close to zero, and the vertical composition term $\mathcal{V}(r_i, c, I)$ or $\mathcal{V}(r_j, c, I)$ could have a value that is close to zero.

In the Equations 8 and 10, the first horizontal term $$\left(\frac{dx_2}{dx_1} - \frac{dx_2^c}{dx_1^c}\right)^2$$

is multiplied by a ratio $$\frac{dx_1}{W}$$

of the left frame distance $dx_1$ to the frame width W, and the second horizontal term $$\left(\frac{dx_1}{dx_2} - \frac{dx_1^c}{dx_2^c}\right)^2$$

is multiplied by a ratio $$\frac{dx_2}{W}$$

of the right frame distance $dx_2$ to the frame width W. In the Equations 9 and 11, the first vertical term $$\left(\frac{dy_2}{dy_1} - \frac{dy_2^c}{dy_1^c}\right)^2$$

is multiplied by a ratio $$\frac{dy_1}{H}$$

of the top frame distance $dy_1$ to the frame height H, and the second vertical term $$\left(\frac{dy_1}{dy_2} - \frac{dy_1^c}{dy_2^c}\right)^2$$

is multiplied by a ratio $$\frac{dy_2}{H}$$

of the bottom frame distance $dy_2$ to the frame height H. In Equations 8 through 11, an exponential function is applied to a negative difference between the first and second horizontal (or vertical) terms that have been multiplied by the respective ratios. The exponent of the negative difference indicates, for example, a similarity between the multiplied first and second terms.

In some cases, multiplying the first and second horizontal and vertical terms by the respective ratios indicates a location extremity of the ROI with respect to the frame I. For example, if an ROI is horizontally very far to the left of an example image (e.g., the left frame distance $dx_1$ has a very small value as compared to the right frame distance $dx_2$), the ratio $$\frac{dx_1}{W}$$

has a very small value as compared to the ratio $$\frac{dx_2}{W}.$$

Additionally or alternatively, the value of the first horizontal term $$\frac{dx_1}{W},$$

is reduced based on the very small value of the ratio $$\left(\frac{dx_2}{dx_1} - \frac{dx_2^c}{dx_1^c}\right)^2$$

and the value of the second term $$\left(\frac{dx_1}{dx_2} - \frac{dx_1^c}{dx_2^c}\right)^2$$

is increased based on the relatively larger value of the ratio $$\frac{dx_2}{W}.$$

In this example, the exponential function indicates a small similarity between the multiplied first and second horizontal terms (e.g., the example ROI has dissimilar left and right frame distances).

To aid understanding, and not by way of limitation, the relative values of the first and second horizontal terms are adjusted by the respective ratios $$\frac{dx_1}{W} \text{ or } \frac{dx_2}{W}$$

based on a horizontal extremity of the ROI's location, and the relative values of the first and second vertical terms are adjusted by the respective ratios $$\frac{dy_1}{H} \text{ or } \frac{dy_2}{H}$$

based on a vertical extremity of the ROI's location. In some cases, subtraction of the second horizontal term from the first horizontal term indicates whether the ROI has a horizontally central or peripheral location in the image. For example, if an example ROI has a horizontally extreme location in an example image (e.g., close to the left or right image periphery), a difference of the first and second horizontal terms could have an increased value, and the horizontal composition term $\mathcal{H}(r_i, c, I)$ or $\mathcal{H}(r_j, c, I)$ could have a value that is increased. Additionally or alternatively, subtraction of the second vertical term from the first vertical term indicates whether the ROI has a vertically central or peripheral location in the image. For example, if the example ROI has a vertically extreme location in the example image (e.g., close to the top or bottom image periphery), a difference of the first and second vertical terms could have an increased value, and the vertical composition term $\mathcal{V}(r_i, c, I)$ or $\mathcal{V}(r_j, c, I)$ could have a value that is increased.

Selection of an Evaluated Crop Candidate

In a crop generation system, such as the crop generation system 200, a crop candidate is selected, such as for the set of selected candidates 270, based on an evaluation score. The evaluation score is determined based on one or more component scores, such as a content preservation score or a composition preservation score. For example, a crop candidate evaluation module in the crop generation system compares at least one content preservation score for a crop candidate to a content threshold. Additionally or alternatively, the evaluation module compares at least one composition preservation score for a crop candidate to a composition threshold. A pool of crop candidates, such as the crop candidate pool 225, is evaluated based on the content threshold and composition threshold, and one or more crop candidates are selected from the candidate pool based on the multiple thresholds.

In some embodiments of the example crop generation system, the evaluation module evaluates a crop candidate pool based on multiple thresholds that are applied in a particular order. For example, the evaluation module applies a first content threshold to the pool of crop candidates, and compares each candidate in the pool to the first content threshold. The evaluation module generates a first modified candidate pool by removing candidates that do not fulfill the first content threshold. In addition, the evaluation module applies a second content threshold to the first modified candidate pool, and generates a second modified candidate pool by removing candidates that do not fulfill the second content threshold. Furthermore, the evaluation module applies a composition threshold to the second modified candidate pool, and generates a third modified candidate pool by removing candidates that do not fulfill the composition threshold.

In some cases, efficiency of the described evaluation techniques is increased by performing operations related to computing a score or applying a threshold in a particular order. As an example of improvements to efficiency, applying the composition threshold subsequent to applying the first and second content thresholds increases efficiency of the described evaluation techniques. In this example, the evaluation module consumes fewer computing resources evaluating a modified candidate pool having had crop candidates removed (e.g., based on the first or second content thresholds), as compared to evaluating an unmodified candidate pool that does not have crop candidates removed.

As an additional example of improvements to efficiency, computing a particular one of the content preservation score or composition preservation score subsequent to applying a threshold increases efficiency of the described evaluation techniques. For instance, a crop candidate evaluation module calculates an eye fixation content preservation score $F_{pf}(R_f, c)$ (such as described in regards to Equation 4) for each crop candidate c in a pool of crop candidates. Based on the eye fixation content preservation scores, the evaluation module applies an eye fixation content threshold to the pool of crop candidates. The evaluation module generates a first modified candidate pool by removing candidates that do not fulfill the eye fixation content threshold. Subsequently, the evaluation module calculates an object content preservation score $F_{pc}(R_c, c)$ (such as described in regards to Equation 3) for each crop candidate c in the first modified candidate pool. Based on the object content preservation scores, the evaluation module applies an object content threshold to the first modified candidate pool. The evaluation module generates a second modified candidate pool by removing candidates that do not fulfill the object content threshold.

In this example, the evaluation module consumes fewer computing resources to calculate the object content preservation scores for crop candidates c in the first modified candidate pool, as compared to calculating object content preservation scores for candidates in the original (e.g., unmodified) pool of crop candidates. In some cases, an improvement in efficiency is provided by calculating multiple content preservation scores based on crop candidates in a modified candidate pool that has had one or more crop candidates removed based on a previous comparison to a threshold.

Continuing with this example, the first modified candidate pool is generated based on the eye fixation content threshold being applied to the pool of crop candidates. Additionally or alternatively, a modified candidate pool could be generated based on the object content threshold being applied to the original (e.g., unmodified) pool of crop candidates. In some cases, an improvement in accuracy, efficiency, or both is provided by generating a first modified candidate pool by applying an eye fixation content threshold to an original (e.g., unmodified) pool of crop candidates. For example, if the image being analyzed depicts zero or very few objects, such as a landscape photograph, a modified candidate pool that is based on the eye fixation content threshold could include candidates that more accurately represent the visual content compared to a modified candidate pool based on the object content threshold. Additionally or alternatively, generating the modified candidate pool based on the eye fixation content threshold provides improvements in efficiency to subsequent operations (e.g., applying a composition threshold), such as by omitting operations related to candidates that do not accurately represent the visual content.

Continuing with this example, the evaluation module calculates an eye fixation composition preservation score $F_{Cf}(R_f, c, I)$ (such as described in regards to Equation 7) for each crop candidate c in the second modified candidate pool. Based on the eye fixation composition preservation scores, the evaluation module applies an eye fixation composition threshold to the second modified candidate pool. The evaluation module generates a third modified candidate pool by removing candidates that do not fulfill the eye fixation composition threshold. In some cases, the third modified candidate pool is provided as a selected candidate set (e.g., selected candidates 270 that are provided to an image editing application). Additionally or alternatively, the evaluation module applies an object composition threshold to the third modified candidate pool, and generates a fourth modified candidate pool by removing candidates that do not fulfill the object composition threshold. In some cases, the fourth modified candidate pool is provided as a selected candidate set.

In this example, the evaluation module consumes fewer computing resources to calculate the eye fixation composition preservation scores for crop candidates c in the second modified candidate pool, as compared to calculating eye fixation composition preservation scores for candidates in the original (e.g., unmodified) pool of crop candidates or in the first modified candidate pool. In some cases, an improvement in efficiency is provided by calculating multiple composition preservation scores based on crop candidates in a modified candidate pool that has had one or more crop candidates removed based on a previous comparison to at least one content threshold. For example, calculation of an eye fixation (or object) composition preservation score may require additional computing resources to determine horizontal and vertical composition terms. Calculating eye fixation or object composition preservation scores based on a modified candidate pool that is reduced in size (e.g., based on comparison to at least one content threshold) could reduce an amount of processing power, memory, or other computing resources required for the calculations.

In some embodiments of the example crop generation system, an evaluation module determines whether a particular crop candidate fulfills one or more respective content thresholds for eye fixation content preservation or object content preservation. An example scoring function for determining eye fixation content preservation, by multiple crop candidates c, of content in the eye fixation ensemble $R_f = \{r_j, j=1 \ldots m\}$ is provided in the example Equation 12. An example of a normalized content threshold for eye fixation content preservation is provided in the example Equation 13.

$$S_1(c) = F_{Pf}(R_f, c) \qquad \text{Eq. 12}$$

$$\theta_1 \max S_1(c) \qquad \text{Eq. 13}$$

In Equation 12, the eye fixation content preservation score set $S_1(c)$ includes an eye fixation content preservation score $F_{Pf}(R_f, c)$ for each crop candidate c that is included in the crop candidate pool. In some cases, the crop candidate pool is provided from a crop candidate generation module, such as the crop candidate pool 225 generated by the crop candidate generation module 220. Additionally or alternatively, the crop candidate pool is a modified candidate pool, such as a modified candidate pool that has had one or more crop candidates removed based on a previous comparison to a threshold.

In Equation 13, a normalized content threshold for eye fixation content preservation is calculated based on a maximum value from the eye fixation content preservation score set $S_1(c)$ multiplied by an eye fixation threshold parameter $\theta_1$. In some cases, the evaluation module generates a modified crop candidate pool based on the normalized eye fixation content threshold. To aid understanding, and not by way of limitation, an increased value of the parameter $\theta_1$ could result in an increased normalized eye fixation content threshold, and the modified candidate pool generated based on Equation 13 could be smaller (e.g., more selective), as compared to if the parameter $\theta_1$ has a decreased value. In some cases, the eye fixation threshold parameter $\theta_1$ is determined based on an input, such as an input from an image editing application or from a user computing device.

An example scoring function for determining object content preservation, by multiple crop candidates c, of content in the object ROI ensemble $R_c = \{r_i, i=1 \ldots n\}$ is provided in the example Equation 14. An example of a normalized content threshold for object content preservation is provided in the example Equation 15. An example function for determining a combined content preservation score set is provided in the example Equation 16.

$$S_2(c) = F_{Pc}(R_c, c) \qquad \text{Eq. 14}$$

$$\theta_2 \max S_2(c) \qquad \text{Eq. 15}$$

$$S(c) = 0.5(S_1(c) + S_2(c)) \qquad \text{Eq. 16}$$

In Equation 14, the object content preservation score set $S_2(c)$ includes an object content preservation score $F_{Pc}(R_c, c)$ for each crop candidate c that is included in the crop candidate pool. In some cases, the crop candidate pool is a modified candidate pool, such as a modified candidate pool that has had one or more crop candidates removed based on a previous comparison to a threshold (e.g., a normalized eye fixation content threshold). Additionally or alternatively, the crop candidate pool is provided from a crop candidate generation module, such as the crop candidate pool 225 generated by the crop candidate generation module 220.

In Equation 15, a normalized content threshold for object content preservation is calculated based on a maximum value from the object content preservation score set $S_2(c)$ multiplied by an object threshold parameter $\theta_2$. In some cases, the evaluation module generates a modified crop candidate pool based on the normalized object content threshold. To aid understanding, and not by way of limitation, an increased value of the parameter $\theta_2$ could result in an increased normalized object content threshold, and the modified candidate pool generated based on Equation 15 could be smaller (e.g., more selective), as compared to if the parameter $\theta_2$ has a decreased value. In some cases, the object threshold parameter $\theta_2$ is determined based on an input, such as an input from an image editing application or from a user computing device.

In Equation 16, a combined content preservation score is determined for each crop candidate remaining in the modified candidate pool, based on the content preservation score sets $S_1(c)$ and $S_2(c)$. For example, the evaluation module determines the combined content preservation score set $S(c)$ for the set of crop candidates in the modified candidate pool. In this example, the eye fixation content preservation score set $S_1(c)$ and the object content preservation score set $S_2(c)$ are weighted equally (e.g., a weight of 0.5), but other implementations are possible. For example, a scene determination neural network could be applied to the image, such as described in regards to FIG. 2. If the image is determined to have a landscape scene type, the eye fixation content preservation score set $S_1(c)$ could be weighted more heavily. If the image is determined to have a portrait scene type, the object content preservation score set $S_2(c)$ could be weighted more heavily.

In some embodiments of the example crop generation system, the evaluation module determines whether a particular crop candidate fulfills one or more respective composition thresholds for eye fixation composition preservation or object composition preservation. An example scoring function for determining eye fixation composition preservation, by multiple crop candidates c, of content in the eye fixation ensemble $R_f = \{r_j, j=1 \ldots m\}$ is provided in the example Equation 17.

$$C(c) = \max\{C_1(c), C_2(c)\} \qquad \text{Eq. 17}$$

In Equation 17, the eye fixation composition preservation score set $C(c)$ has a value that is a maximum of a global composition preservation score set $C(c)$ and a local composition preservation score set $C(c)$. An example scoring function for determining the global composition preservation score set $C(c)$ is provided in the example Equation 18. An example scoring function for determining the local composition preservation score set $C_c(c)$ is provided in the example Equation 19.

$$C_1(c) = F_C(G, c, I) \qquad \text{Eq. 18}$$

$$C_2(c) = F_{Cf}(R_f, c, G) \qquad \text{Eq. 19}$$

In Equations 18 and 19, composition preservation scores $F_C$ and $F_{Cf}$ are determined, such as described in regards to Equations 6 and 7. The composition preservation scores $F_C$ and $F_{Cf}$ are determined for each of the crop candidates c in the crop candidate pool (or modified crop candidate pool). In Equations 18 and 19, a frame G is a bounding box that encompasses all of the ROIs included in the eye fixation ROI ensemble $R_f$, and a frame I is a bounding box that encompasses all of the image (e.g., the frame I has dimensions equal to the dimensions of the image). In some cases, the frame G is a tightly-fit bounding box encompassing the eye fixation ROIs without encompassing additional (e.g., non-ROI) visual content of the image.

In Equation 18, the frame G is treated as a single ROI for the image frame I. The composition preservation score $F_C$ is determined for each of the crop candidates c in the crop candidate pool (or modified crop candidate pool). To aid understanding, and not by way of limitation, each composition preservation score $F_C$ could indicate the relative centeredness of the respective crop candidate c with respect to the combination of all of the eye fixation ROIs, i.e., encompassed by the frame G. Additionally or alternatively, the composition preservation score $F_C$ for a particular crop candidate could have an increased value if the particular candidate has a relatively similar position with respect to the frame G as to the image frame I. In Equation 18, the global composition preservation score set $\mathcal{C}$ (c) includes a value for each of the crop candidates based on the composition preservation score $F_C$.

In Equation 19, the composition preservation score $F_{Cf}$ is determined for each crop candidate with respect to the eye fixation ensemble $R_f=\{r_j, j=1 \ldots m\}$, within the frame G. To aid understanding, and not by way of limitation, each composition preservation score $F_{Cf}$ could indicate the relative centeredness of the respective crop candidate c with respect to each particular eye fixation ROI included in the ensemble $R_f$. Additionally or alternatively, the composition preservation score $F_{Cf}$ for a particular crop candidate could have an increased value if the particular candidate has a relatively similar position with respect to the particular eye fixation ROI as to the frame G. In Equation 19, the local composition preservation score set $\mathcal{C}_2$(c) includes a value for each of the crop candidates based on the composition preservation score $F_{Cf}$.

In Equation 17, the eye fixation composition preservation score set $\mathcal{C}$ (c) includes a value for each of the crop candidates c in the crop candidate pool (or modified crop candidate pool), based on a maximum of the global composition preservation score set $\mathcal{C}$ (c) and the local composition preservation score set $\mathcal{C}$ (c). In some cases, the evaluation module modifies (or additionally modifies) the crop candidate pool based on a composition threshold. An example of a normalized composition threshold for eye fixation composition preservation is provided in the example Equation 20.

$$\theta_3 \max \mathcal{C}_{(c)} \qquad \text{Eq. 20}$$

In Equation 20, a normalized composition threshold for eye fixation composition preservation is calculated based on a maximum value from the eye fixation composition preservation score set $\mathcal{C}$ (c) multiplied by a composition threshold parameter $\theta_3$. In some cases, the evaluation module generates a modified crop candidate pool based on the normalized eye fixation composition threshold. To aid understanding, and not by way of limitation, an increased value of the parameter $\theta_3$ could result in an increased normalized eye fixation composition threshold, and the modified candidate pool generated based on Equation 20 could be smaller (e.g., more selective), as compared to if the parameter $\theta_3$ has a decreased value. In some cases, the composition threshold parameter $\theta_3$ is determined based on an input, such as an input from an image editing application or from a user computing device.

The Equations 17 through 20 are explained herein in relation to eye fixation composition preservation. However, additional implementations are possible, such as by applying the Equations 17 through 20 an object ensemble $R_c=\{r_i, i=1 \ldots n\}$ to determine object composition preservation by multiple crop candidates c.

In some embodiments, the evaluation module determines the evaluation score for each particular crop candidate based on a combination of the respective content preservation score and composition preservation score for the particular crop candidate. An example function for determining an evaluation score set is provided in the example Equation 21.

$$\mathcal{J}_{(c)}=0.5(\mathcal{S}_{(c)}+\mathcal{C}_{(c)}) \qquad \text{Eq. 21}$$

In Equation 21, an evaluation score is determined for each crop candidate remaining in the modified candidate pool, based on a combination of the content preservation score set $\mathcal{S}$ (c) and the composition preservation score set $\mathcal{C}$ (c). In this example, the content preservation score set $\mathcal{S}$ (c) and the composition preservation score set $\mathcal{C}$ (c) are weighted equally (e.g., a weight of 0.5), but other implementations are possible. For example, if the image includes multiple ROIs in various locations, the content preservation score set $\mathcal{S}$ (c) could be weighted more heavily. If the image includes a small number of ROIs in a peripheral location, the composition preservation score set $\mathcal{C}$ (c) could be weighted more heavily.

In some embodiments, the evaluation module selects one or more crop candidates, such as for the selected candidate set 270, based on the evaluation score set $\mathcal{J}$ (c). For example, the evaluation scores in the evaluation score set $\mathcal{J}$ (c) are compared to an evaluation threshold. Based on each evaluation score's relation to the evaluation threshold, each respective crop candidate is included in or omitted from a set of selected crop candidates. Additionally or alternatively, the evaluation module performs one or more operations related to non-maximum suppression. For example, the evaluation module determines multiple subsets of scores in the evaluation score set $\mathcal{J}$ (c). In some cases, each of the subsets corresponds to a group of crop candidates that represent similar portions of the visual content, such as a group of crop candidates with slightly different coordinates, but which each include similar or identical ROIs. Based on the non-maximum suppression, one or more crop candidates that are within a threshold similarity to another crop candidate are omitted from the selected candidate set (e.g., similar candidates within a group are omitted). In some cases, applying non-maximum suppression to the subsets provides a variety of crop candidates for inclusion in the selected candidate set.

Figure 7:
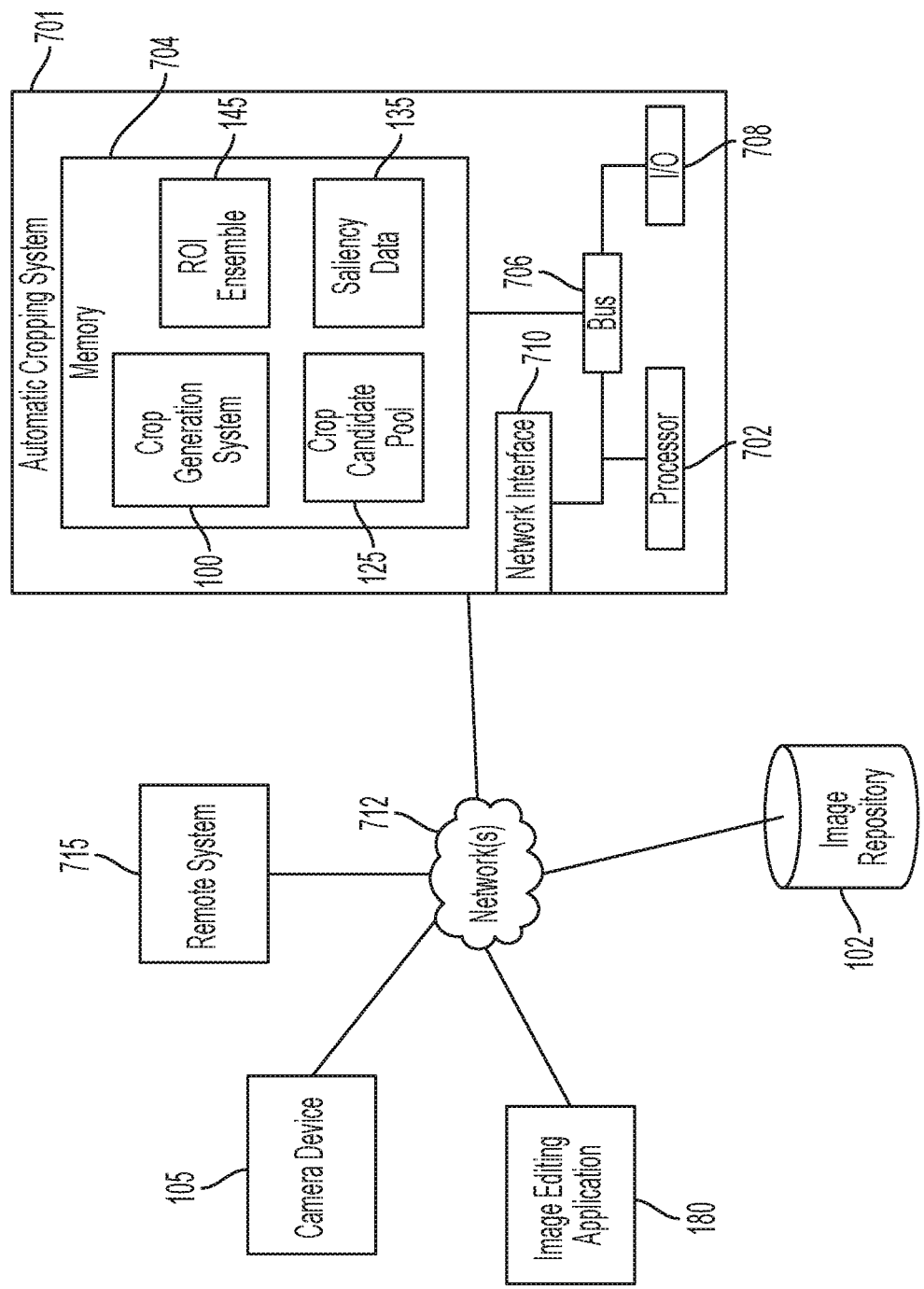
FIG. 7 is a block diagram depicting an example of a computing system for automatic generation and evaluation of crop candidates, according to certain embodiments.

Any suitable computing system or group of computing systems can be used for performing the operations described herein. For example, FIG. 7 is a block diagram depicting a computing system configured to provide automatic generation and evaluation of crop candidates, according to certain embodiments.

The depicted example of an automatic cropping system 701 includes one or more processors 702 communicatively coupled to one or more memory devices 704. The processor 702 executes computer-executable program code or accesses information stored in the memory device 704. Examples of processor 702 include a microprocessor, an application-specific integrated circuit ("ASIC"), a field-programmable gate array ("FPGA"), or other suitable processing device. The processor 702 can include any number of processing devices, including one.

The memory device 704 includes any suitable non-transitory computer-readable medium for storing the crop generation system 100, the crop candidate pool 125, the ROI ensemble(s) 145, the saliency data 135, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The automatic cropping system 701 may also include a number of external or internal devices such as input or output devices. For example, the automatic cropping system 701 is shown with an input/output ("I/O") interface 708 that can receive input from input devices or provide output to output devices. A bus 706 can also be included in the automatic cropping system 701. The bus 706 can communicatively couple one or more components of the automatic cropping system 701.

The automatic cropping system 701 executes program code that configures the processor 702 to perform one or more of the operations described above with respect to FIGS. 1-6. The program code includes operations related to, for example, one or more of the crop generation system 100, the crop candidate pool 125, the ROI ensemble(s) 145, the saliency data 135, or other suitable applications or memory structures that perform one or more operations described herein. The program code may be resident in the memory device 704 or any suitable computer-readable medium and may be executed by the processor 702 or any other suitable processor. In some embodiments, the program code described above, the crop generation system 100, the crop candidate pool 125, the ROI ensemble(s) 145, and the saliency data 135 are stored in the memory device 704, as depicted in FIG. 7. In additional or alternative embodiments, one or more of the crop generation system 100, the crop candidate pool 125, the ROI ensemble(s) 145, the saliency data 135, and the program code described above are stored in one or more memory devices accessible via a data network, such as a memory device accessible via a cloud service.

The automatic cropping system 701 depicted in FIG. 7 also includes at least one network interface 710. The network interface 710 includes any device or group of devices suitable for establishing a wired or wireless data connection to one or more data networks 712. Non-limiting examples of the network interface 710 include an Ethernet network adapter, a modem, and/or the like. A remote system 715 is connected to the automatic cropping system 701 via network 712, and remote system 715 can perform some of the operations described herein, such as generating crop candidates, determining saliency data, or implementing a scene determination neural network model. The automatic cropping system 701 is able to communicate with one or more of the remote computing system 715, the camera device 105, the image editing application 180, or the image repository 102 using the network interface 710. Although FIG. 7 depicts the image editing application 180 as connected to automatic cropping system 701 via the networks 712, other embodiments are possible, including the image editing application 180 running as a program in the memory 704 of automatic cropping system 701.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of producing a crop candidate for a graphical digital image, the method comprising:
   identifying, for an input image, a first crop candidate and a second crop candidate, wherein the first crop candidate and the second crop candidate encompass different portions of the input image;
   generating an ensemble of multiple regions of interest (ROI ensemble), wherein a first ROI of the ROI ensemble encompasses a first portion of the input image having visual content indicated by saliency data for the input image, and a second ROI of the ROI ensemble encompasses a second portion of the input image having different visual content indicated by the saliency data for the input image;
   computing a first evaluation score for the first crop candidate and a second evaluation score for the second crop candidate, wherein each evaluation score indicates a preservation, by a respective crop candidate, of the visual content that is included in a combination of at least the first ROI and the second ROI;
   generating, based on the first evaluation score and the second evaluation score, a selected set of crop candidates that includes the first crop candidate and that excludes the second crop candidate; and
   providing the selected set of crop candidates to an image editing application.

2. The method of claim 1, wherein the saliency data comprises (i) an eye fixation saliency map indicating a region of the input image that is likely to receive visual attention, and (ii) an object saliency map indicating a location of an object depicted in the input image.

3. The method of claim 1, wherein each evaluation score is computed from a combination of:
   (i) a content preservation score indicating a quantity of ROIs, of the multiple ROIs in the ROI ensemble, that are encompassed by the respective crop candidate, and
   (ii) a composition preservation score indicating a relative crop position of the first ROI with respect to the respective crop candidate.

4. The method of claim 3, further comprising computing the content preservation score by performing operations comprising:
- determining a ratio between a total area of the first ROI and an overlapping area that is included in the first ROI and in the respective crop candidate;
- determining, based on the ratio, that the first ROI is encompassed by the respective crop candidate; and
- determining the quantity of ROIs based on a summation of the ratio and an additional ratio indicating an additional ROI in the ROI ensemble that is encompassed by the respective crop candidate.

5. The method of claim 3, further comprising computing the content preservation score by performing operations comprising:
- determining a ratio between a total area of the second ROI and an overlapping area that is included in the second ROI and in the respective crop candidate;
- determining, based on the ratio, that the respective crop candidate incompletely encompasses the second ROI; and
- responsive to determining that the respective crop candidate incompletely encompasses the second ROI, computing the content preservation score based on a summation between (i) the quantity of ROIs that are encompassed by the respective crop candidate, and (ii) the ratio.

6. The method of claim 3, further comprising computing the composition preservation score by performing operations comprising:
- determining the relative crop position of the first ROI by computing a first distance between an edge of the first ROI to an edge of the respective crop candidate and a second distance between an additional edge of the first ROI to an additional edge of the respective crop candidate;
- determining a relative frame position of the first ROI by computing a third distance between the edge of the first ROI to an edge of a frame of the input image and a fourth distance between the additional edge of the first ROI to an additional edge of the frame of the input image; and
- determining a difference between the relative frame position and the relative crop position.

7. The method of claim 3, further comprising computing the composition preservation score by determining a sum of (i) the relative crop position of the first ROI and (ii) an additional relative crop position of the second ROI with respect to the respective crop candidate.

8. The method of claim 3, wherein computing each evaluation score further comprises:
- determining a group of crop candidates including the first crop candidate and the second crop candidate;
- determining that a first content preservation score for the first crop candidate is within a first threshold difference from a maximum content preservation score associated with the group of crop candidates;
- responsive to determining that the first content preservation score is within the first threshold difference, generating a content-filtered group of crop candidates by selecting the first crop candidate from the group of crop candidates;
- determining that a first composition preservation score for the first crop candidate is within a second threshold difference from a maximum composition preservation score associated with the group of crop candidates;
- responsive to determining that the first composition preservation score is within the second threshold difference, generating a composition-filtered group of crop candidates by selecting the first crop candidate from the group of crop candidates; and
- responsive to determining that the first crop candidate is included in the content-filtered group of crop candidates and in the composition-filtered group of crop candidates, computing an evaluation score of the first crop candidate.

9. The method of claim 8, wherein computing each evaluation score further comprises:
- generating a global bounding frame that encompasses the multiple ROIs in the ROI ensemble and omits a portion of the input image that is not included in any of the multiple ROIs in the ROI ensemble,
- wherein the first composition preservation score is based on (i) a global relative crop position of the global bounding frame with respect to the first crop candidate, and (ii) a respective relative crop position of each of the multiple ROIs in the ROI ensemble with respect to the first crop candidate.

10. A non-transitory computer-readable medium embodying program code for producing a crop candidate for a graphical digital image, the program code comprising instructions which, when executed by a processor, cause the processor to perform operations comprising:
- identifying, for an input image, a first crop candidate and a second crop candidate, wherein the first crop candidate and the second crop candidate encompass different portions of the input image;
- generating an ensemble of multiple regions of interest (ROI ensemble), wherein a first ROI of the ROI ensemble encompasses a first portion of the input image and a second ROI of the ROI ensemble encompasses a second portion of the input image, the first ROI and the second ROI each having visual content indicated by saliency data for the input image;
- computing a first evaluation score for the first crop candidate and a second evaluation score for the second crop candidate, wherein each evaluation score indicates a representation, by a respective crop candidate, of the visual content included in a combination of at least the first ROI and the second ROI;
- generating, based on the first evaluation score and the second evaluation score, a selected set of crop candidates that includes the first crop candidate and that excludes the second crop candidate; and
- providing the selected set of crop candidates to an image editing application.

11. The non-transitory computer-readable medium of claim 10, wherein the saliency data comprises (i) an eye fixation saliency map indicating a region of the input image that is likely to receive visual attention, and (ii) an object saliency map indicating a location of an object depicted in the input image.

12. The non-transitory computer-readable medium of claim 10, wherein computing the first evaluation score further comprises:
- computing a content preservation score indicating a quantity of ROIs, of the multiple ROIs in the ROI ensemble, that are encompassed by the first crop candidate; and
- computing a composition preservation score indicating a relative crop position of the first ROI with respect to the first crop candidate,
- wherein the first evaluation score is based on a combination of the content preservation score and the composition preservation score.

13. The non-transitory computer-readable medium of claim 12, wherein computing the content preservation score further comprises:
- determining a ratio between a total area of the first ROI and an overlapping area that is included in the first ROI and in the respective crop candidate;
- determining, based on the ratio, that the first ROI is encompassed by the respective crop candidate; and determining the quantity of ROIs based on a summation of the ratio and an additional ratio indicating an additional ROI in the ROI ensemble that is encompassed by the respective crop candidate.

14. The non-transitory computer-readable medium of claim 12, wherein computing the composition preservation score further comprises:
determining the relative crop position of the first ROI by computing a first distance between an edge of the first ROI to an edge of the respective crop candidate and a second distance between an additional edge of the first ROI to an additional edge of the respective crop candidate;
determining a relative frame position of the first ROI by computing a third distance between the edge of the first ROI to an edge of a frame of the input image and a fourth distance between the additional edge of the first ROI to an additional edge of the frame of the input image; and
determining a difference between the relative frame position and the relative crop position.

15. A system for producing a crop candidate for a graphical digital image, the system comprising:
a processor configured for identifying, for an input image, a first crop candidate and a second crop candidate, wherein the first crop candidate and the second crop candidate encompass different portions of the input image;
a means for generating an ensemble of multiple regions of interest (ROI ensemble), wherein a first ROI of the ROI ensemble encompasses a first portion of the input image and a second ROI of the ROI ensemble encompasses a second portion of the input image, the first ROI and the second ROI each having visual content indicated by saliency data for the input image; and
a means for computing a first evaluation score for the first crop candidate and a second evaluation score for the second crop candidate, wherein each evaluation score indicates a representation, by a respective crop candidate, of the visual content included in a combination of at least the first ROI and the second ROI;
wherein the processor is further configured for:
generating, based on the first evaluation score and the second evaluation score, a selected set of crop candidates that includes the first crop candidate and that excludes the second crop candidate; and
providing the selected set of crop candidates to an image editing application.

16. The system of claim 15, wherein the saliency data comprises (i) an eye fixation saliency map indicating a region of the input image that is likely to receive visual attention, and (ii) an object saliency map indicating a location of an object depicted in the input image.

17. The system of claim 15, wherein computing each evaluation score comprises computing the evaluation score from a combination of:
(i) a content preservation score indicating a quantity of ROIs, of the multiple ROIs in the ROI ensemble, that are encompassed by the respective crop candidate, and
(ii) a composition preservation score indicating a relative crop position of the first ROI with respect to the respective crop candidate.

18. The system of claim 17, wherein computing the content preservation score comprises:
determining a ratio between a total area of the first ROI and an overlapping area that is included in the first ROI and in the respective crop candidate;
determining, based on the ratio, that the first ROI is encompassed by the respective crop candidate; and
determining the quantity of ROIs based on a summation of the ratio and an additional ratio indicating an additional ROI in the ROI ensemble that is encompassed by the respective crop candidate.

19. The system of claim 17, wherein computing the content preservation score comprises:
determining a ratio between a total area of the second ROI and an overlapping area that is included in the second ROI and in the respective crop candidate;
determining, based on the ratio, that the respective crop candidate incompletely encompasses the second ROI; and
computing, responsive to determining that the respective crop candidate incompletely encompasses the second ROI, the content preservation score based on a summation between (i) the quantity of ROIs that are encompassed by the respective crop candidate, and (ii) the ratio.

20. The system of claim 17, wherein computing the composition preservation score comprises:
determining the relative crop position of the first ROI by computing a first distance between an edge of the first ROI to an edge of the respective crop candidate and a second distance between an additional edge of the first ROI to an additional edge of the respective crop candidate;
determining a relative frame position of the first ROI by computing a third distance between the edge of the first ROI to an edge of a frame of the input image and a fourth distance between the additional edge of the first ROI to an additional edge of the frame of the input image; and
determining a difference between the relative frame position and the relative crop position.

* * * * *